United States Patent
Onuma

(10) Patent No.: US 10,419,653 B2
(45) Date of Patent: Sep. 17, 2019

(54) VIBRATION DRIVE DEVICE CAPABLE OF GENERATING CLICK FEELING AND IMAGE PICKUP APPARATUS

(71) Applicant: CANON KABUSHIKI KAISHA, Tokyo (JP)

(72) Inventor: Kazufumi Onuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/180,440

(22) Filed: Jun. 13, 2016

(65) Prior Publication Data

US 2016/0373630 A1    Dec. 22, 2016

(30) Foreign Application Priority Data

Jun. 19, 2015  (JP) ................. 2015-123829

(51) Int. Cl.
*H04N 5/225* (2006.01)
*G06F 3/00* (2006.01)
(Continued)

(52) U.S. Cl.
CPC ........... *H04N 5/2257* (2013.01); *G06F 3/016* (2013.01); *H02N 2/0015* (2013.01); *H02N 2/103* (2013.01);
(Continued)

(58) Field of Classification Search
CPC ...... H04N 5/2257; G06F 3/016; H02N 2/163; H02N 2/103
See application file for complete search history.

(56) References Cited

U.S. PATENT DOCUMENTS 5,453,653 A    9/1995  Zumeris
5,616,980 A    4/1997  Zumeris
(Continued)

FOREIGN PATENT DOCUMENTS

CN    1617366 A    5/2005
CN    1898855 A    1/2007
(Continued)

OTHER PUBLICATIONS

Extended European Search Report dated Nov. 23, 2016, in European Patent Application No. 16174914.8.
(Continued)

*Primary Examiner* — Abdelaaziz Tissire
(74) *Attorney, Agent, or Firm* — Venable LLP

(57) ABSTRACT

A vibration drive device giving an appropriate click feeling when an operation member driven by a vibration actuator is manually operated. A controller applies, to a piezoelectric element, a drive signal for exciting, in an elastic body joined to the piezoelectric element, only a first vibration perpendicular to a contact surface between the elastic body and a driven element, or the first vibration and a second vibration parallel to the contact surface. When the position of the operation member is outside a driving section, only the first vibration is excited, whereas when within the driving section, the first vibration and the second vibration are excited so as to make the position closer to a target position set within the driving section. Application of the drive signal is stopped when the position is in a section in the driving section for a predetermined time period.

21 Claims, 13 Drawing Sheets

(51) Int. Cl.
*G06F 3/01* (2006.01)
*H02N 2/00* (2006.01)
*H02N 2/10* (2006.01)
*H02N 2/14* (2006.01)
*H02N 2/16* (2006.01)

(52) U.S. Cl.
CPC .............. *H02N 2/14* (2013.01); *H02N 2/142* (2013.01); *H02N 2/163* (2013.01)

(56) References Cited

U.S. PATENT DOCUMENTS

| | | |
|---|---|---|
| 5,682,076 A | 10/1997 | Zumeris |
| 5,714,833 A | 2/1998 | Zumeris |
| 5,777,423 A | 7/1998 | Zumeris |
| 5,854,528 A | 12/1998 | Nishikura et al. |
| 5,877,579 A | 3/1999 | Zumeris |
| 6,064,140 A | 5/2000 | Zumeris |
| 7,109,639 B2 | 9/2006 | Yamamoto et al. |
| 7,187,104 B2 | 3/2007 | Yamamoto et al. |
| 7,233,096 B2 | 6/2007 | Maruyama et al. |
| 7,675,218 B2 | 3/2010 | Kawaguchi et al. |
| 9,013,622 B2 | 4/2015 | Kawai |
| RE45,856 E | 1/2016 | Kawai et al. |
| 2004/0189150 A1* | 9/2004 | Yamamoto ............ H02N 2/0015 310/323.02 |
| 2006/0250047 A1* | 11/2006 | Yamamoto ............. H02N 2/001 310/317 |
| 2006/0255683 A1* | 11/2006 | Suzuki .................... G05G 1/10 310/317 |
| 2008/0055241 A1* | 3/2008 | Goldenberg ............ G06F 3/016 345/156 |
| 2009/0003814 A1* | 1/2009 | Okamura ................ G03B 5/02 396/55 |
| 2009/0066187 A1* | 3/2009 | Kudo ..................... H02N 2/062 310/316.02 |
| 2010/0097198 A1* | 4/2010 | Suzuki .................... G06F 3/016 340/407.2 |
| 2010/0271340 A1* | 10/2010 | Nagashima .......... G01C 21/265 345/184 |
| 2011/0298400 A1* | 12/2011 | Kudo ................... H02N 2/0015 318/116 |
| 2012/0177354 A1 | 7/2012 | Ashizawa et al. |
| 2012/0270605 A1* | 10/2012 | Garrone ............ H04M 1/72563 455/566 |
| 2012/0287328 A1 | 11/2012 | Kawai et al. |
| 2013/0249445 A1* | 9/2013 | Sumioka ................ H02N 2/142 318/116 |
| 2015/0138387 A1* | 5/2015 | Kokubu ............ G06F 3/04886 348/222.1 |

FOREIGN PATENT DOCUMENTS

| | | |
|---|---|---|
| EP | 2 192 469 A2 | 6/2010 |
| JP | 05-083961 A | 4/1993 |
| JP | 08-237971 A | 9/1996 |
| JP | 2004-320846 A | 11/2004 |
| JP | 2010-257052 A | 11/2010 |
| JP | 2012-155674 A | 8/2012 |
| JP | 2013-101306 A | 5/2013 |

OTHER PUBLICATIONS

Office Action dated Jun. 4, 2018, in Chinese Patent Application No. 201610430523.9.

* cited by examiner

A MODE

B MODE

PRIOR ART

PRIOR ART

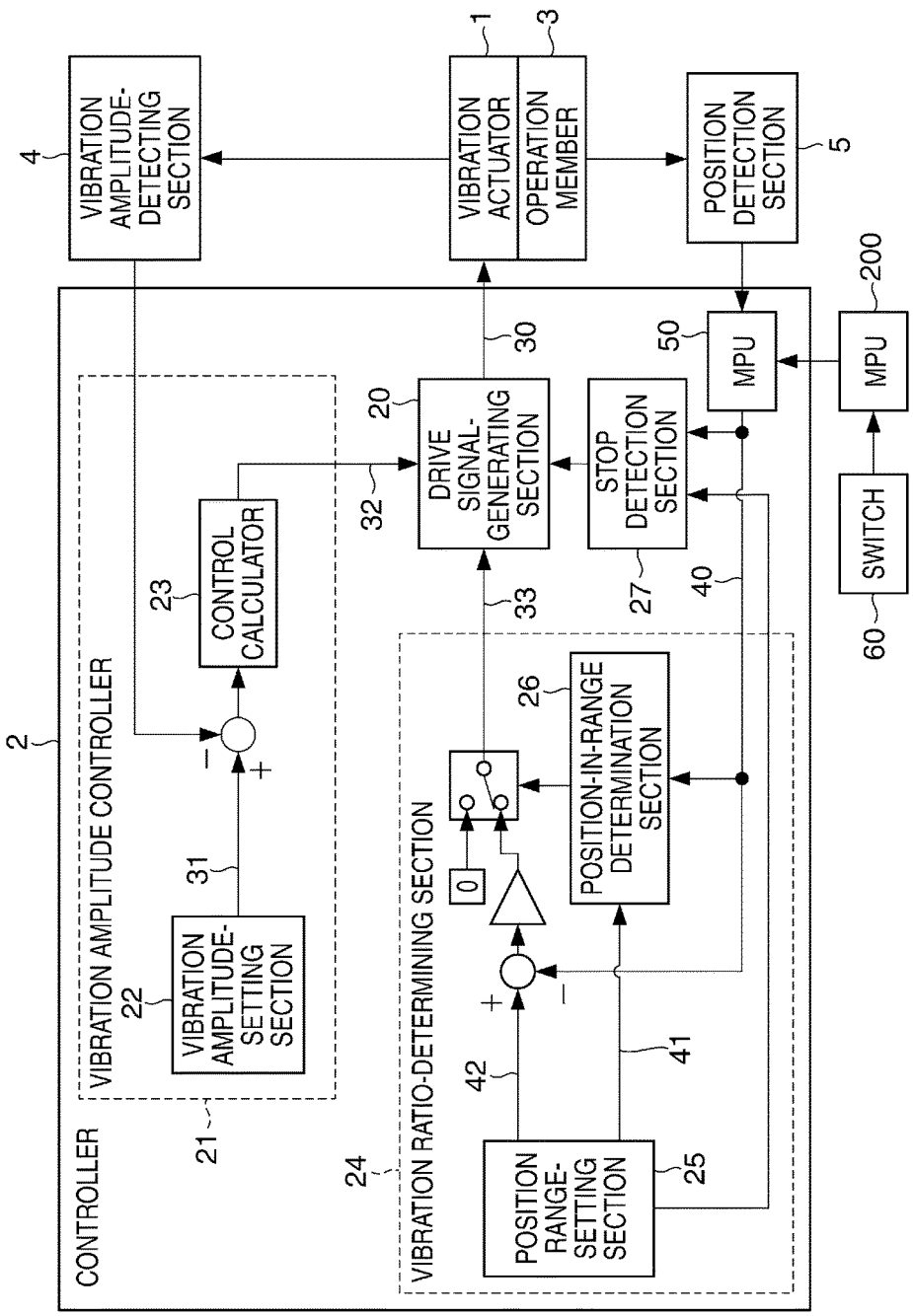

VIBRATION DRIVE DEVICE CAPABLE OF GENERATING CLICK FEELING AND IMAGE PICKUP APPARATUS

BACKGROUND OF THE INVENTION

Field of the Invention

The present invention relates to a vibration drive device including a vibration actuator and a controller for the vibration actuator, and an image pickup apparatus, and more particularly to a control technique for generating a click feeling when the vibration actuator is manually operated.

Description of the Related Art

In recent years, image pickup apparatuses, such as a digital camera, include one having a manually operable ring member which is provided around a lens barrel so as to make it possible to change the settings of photographing conditions and the like. This ring member is provided with a mechanism for generating a click feeling. This enables an operator (user) manually operating the ring member to recognize the number of steps the operator has gone through for changing a setting, based on the tactile sense of the operator's finger.

As the mechanism for providing a click feeling for the ring member, for example, there has been known a mechanism that generates a click feeling by bringing a click plate and a click ball into contact with each other. However, generally, this mechanism causes a click feeling to be generated at fixed intervals, and hence the operator is sometimes required to rotate the ring member through a plurality of turns, depending on an operation mode or type of a parameter to be set, which is not user-friendly.

To solve this problem, there has been proposed an operation ring that is capable of changing the setting of whether or not to generate a click feeling and/or the generation interval depending on the operation mode or parameter desired to be set (see e.g. Japanese Patent Laid-Open Publication No. 2013-101306). Further, there has been proposed an operation unit having a configuration for providing a click feeling for a user interface, using an actuator, for an electronic apparatus (digital camera) (see e.g. Japanese Patent Laid-Open Publication No. 2012-155674).

In the technique described in Japanese Patent Laid-Open Publication No. 2013-101306, load on the operation ring is changed by a load controller using a piezoelectric element to thereby generate a click feeling. Therefore, it is impossible to cause an operator to feel a sense as if the operation ring is drawn into a location where a click is generated. Further, there is a problem that the operation ring stops at a location where the operator releases the operator's hand from the operation ring, and hence the operation ring does not necessarily stop at a preset position.

On the other hand, in the technique described in Japanese Patent Laid-Open Publication No. 2012-155674, a click feeling is generated by controlling a DC motor using an angle detector and a torque detector, and hence it is possible to properly generate a click feeling. However, the torque detector is required to be used, which increases the number of components, so that the weight of the image pickup apparatus is increased, and further, the costs are also increased.

Further, Japanese Patent Laid-Open Publication No. 2010-257052 describes a vibration drive device (rotary input device) including a vibration actuator (ultrasonic motor). However, this vibration drive device suffers from the following problems:

In a case where the operator manually operates a rotary operation element driven by the vibration actuator, when the vibration actuator is in a non-driven state, the vibration actuator starts rotation only after the manual operation force exceeds a static friction torque generated by friction between a stator and a rotor in pressure contact with each other. Therefore, a large operation force is required, and what is more, a smooth operation feeling cannot be obtained. Further, an operation force exceeding a motion friction torque is also required during rotating operation thereof, and hence it is not easy to operate the rotary operation element. On the other hand, if the frictional force between the stator and rotor is set to a small value, a force causing a sense as if the rotary operation element is drawn into a desired location is so small that a sufficient reaction force cannot be felt.

Furthermore, there is a problem that when the direction of rotational force is switched between a normal direction and a reverse direction, there occurs an oscillating behavior around a desired location, which prevents the position of the rotary operation element from being set to the desired location with accuracy.

SUMMARY OF THE INVENTION

The present invention provides a technique that enables an operation member capable of being driven by a vibration actuator and being manually operated by an operator to generate an appropriate click feeling with a simple configuration and be accurately positioned when the operator manually operates the operation member.

In a first aspect of the present invention, there is provided a vibration drive device comprising a vibration actuator including a vibration element including an electromechanical energy conversion element, and an elastic body joined to the electromechanical energy conversion element, and a driven element that is in pressure contact with the elastic body, a position detection unit configured to detect a relative position between the vibration element and the driven element, and a controller that applies a drive signal for exciting only a first vibration in a direction perpendicular to a contact surface between the elastic body and the driven element, or the first vibration and a second vibration parallel to the contact surface in the elastic body, to the electromechanical energy conversion element, wherein in a case where the relative position is outside a first section, the controller excites only the first vibration in the elastic body by the drive signal, whereas in a case where the relative position is within the first section, the controller excites the first vibration and the second vibration in the elastic body by the drive signal so as to make the relative position closer to a target position set within the first section, wherein the first section includes a second section including the target position, and wherein the controller stops applying the drive signal to the electromechanical energy conversion element, when the relative position is within the second section for a predetermined time period including zero.

In a second aspect of the present invention, there is provided an image pickup apparatus comprising a vibration drive device including a vibration actuator, the vibration actuator including a vibration element including an electromechanical energy conversion element, and an elastic body joined to the electromechanical energy conversion element, and a driven element that is in pressure contact with the elastic body, and an operation member that is directly or indirectly joined to the vibration actuator included in the vibration drive device, and is driven by the vibration actuator, the vibration drive device further including a position detection unit configured to detect a relative position between the vibration element and the driven element, and a controller that applies a drive signal for exciting only a first vibration in a direction perpendicular to a contact surface between the elastic body and the driven element, or the first vibration and a second vibration parallel to the contact surface in the elastic body, to the electromechanical energy conversion element, wherein in a case where the relative position is outside a first section, the controller excites only the first vibration in the elastic body by the drive signal, whereas in a case where the relative position is within the first section, the controller excites the first vibration and the second vibration in the elastic body by the drive signal so as to make the relative position closer to a target position set within the first section, wherein the first section includes a second section including the target position, and wherein the controller stops applying the drive signal to the electromechanical energy conversion element, when the relative position is within the second section for a predetermined time period including zero.

According to the present invention, when the operator manually operates the operation member capable of being driven by the vibration actuator and being manually operated by the operator, the operation member can generate an appropriate click feeling with a simple configuration and accurately position the operation member.

Further features of the present invention will become apparent from the following description of exemplary embodiments (with reference to the attached drawings).

BRIEF DESCRIPTION OF THE DRAWINGS

FIG. 9 is a schematic block diagram of a controller of a vibration actuator of a vibration drive device according to a second embodiment included in the image pickup apparatus shown in FIG. 1.

DESCRIPTION OF THE EMBODIMENTS

The present invention will now be described in detail below with reference to the accompanying drawings showing embodiments thereof.

Figure 1A:
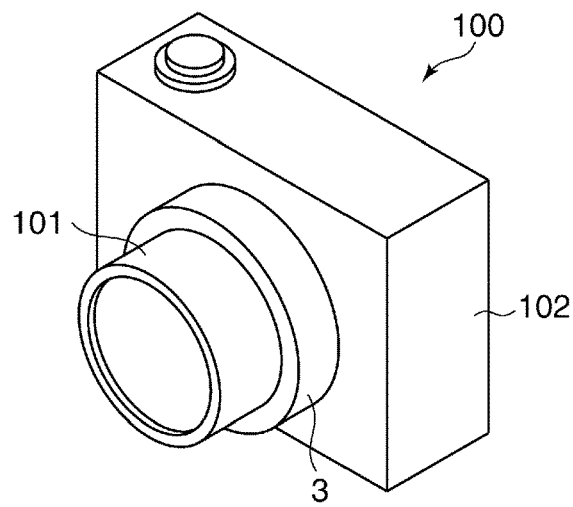
FIG. 1A is a perspective view of the appearance of an image pickup apparatus to which a vibration drive device according to embodiments of the present invention is applied.
Figure 1B:
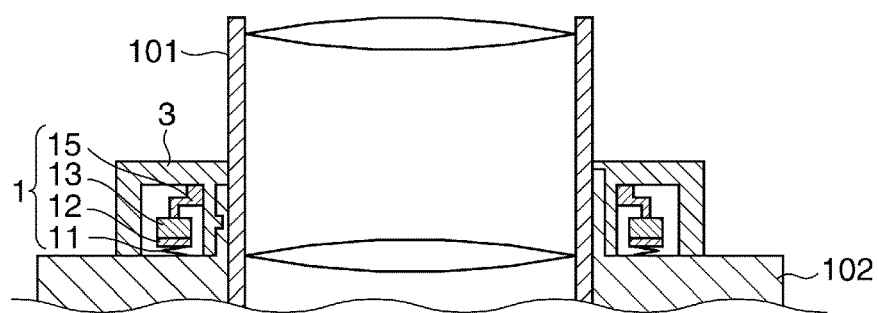
FIG. 1B is a schematic cross-sectional view of an operation member and its peripheral components, included in the image pickup apparatus.
Figure 1C:
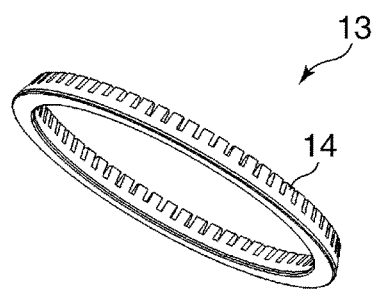
FIG. 1C is a perspective view of an elastic body as a component of a vibration actuator included in the image pickup apparatus.

FIG. 1A is a perspective view of the appearance of an image pickup apparatus 100 to which a vibration drive device according to embodiments of the present invention is applied. FIG. 1B is a schematic cross-sectional view of an operation member 3 and its peripheral components, included in the image pickup apparatus 100. FIG. 1C is a perspective view of an elastic body 13 as a component of a vibration actuator 1 included in the image pickup apparatus 100.

As shown in FIG. 1A, the image pickup apparatus 100 has a structure in which a lens barrel 101 is disposed on a front side of a camera body 102, and the operation member 3, which has a ring shape, is disposed in a manner surrounding the lens barrel 101. The operation member 3 is a user interface to which is applied a function of changing various photographing parameters, such as zooming, focusing, an ISO value, and a photographing mode. In the image pickup apparatus 100, light having passed through the lens barrel 101 forms an image on an image pickup device (e.g. a CMOS image sensor), not shown, or a film, provided in the camera body 102, whereby an object image is photographed.

As shown in FIG. 1B, the operation member 3 incorporates the vibration actuator 1, which has a ring shape, and the vibration actuator 1 includes a pressing member 11, a piezoelectric element 12, the elastic body 13, and a driven element 15. The piezoelectric element 12 and the elastic body 13 form a vibration element.

The piezoelectric element 12 as an example of an electromechanical energy conversion element has one surface thereof joined to the elastic body 13. The surface of the piezoelectric element 12, via which piezoelectric element 12 is joined to the elastic body 13, is formed with a common electrode (full-surface electrode) connected to a GND potential, and the other surface of the same is formed with drive electrodes to each of which a drive signal is applied. By applying two-phased drive signals having a temporal phase difference to the drive electrodes of the piezoelectric element 12, a flexural vibration (travelling waves) which travels in a circumferential direction is excited in the elastic body 13. Note that there are various configurations of the piezoelectric element 12 which make it possible to excite such travelling waves in the elastic body 13, and a well-known configuration can be used. Therefore, detailed description thereof is omitted.

Although not shown, a wiring unit, such as a flexible circuit board, for applying the drive signals to the piezoelectric element 12 is provided between the drive electrode-side of the piezoelectric element 12 and the pressing member 11. As the pressing member 11, a ring-shaped leaf spring can be used, for example.

The elastic body 13 is formed e.g. of a metal, such as stainless steel, and as shown in FIG. 1C, a surface of the elastic body 13 which is in contact with the driven element 15 is formed with protrusions 14 at predetermined intervals in a circumferential direction (in other words, the protrusions 14 are formed by forming grooves at predetermined intervals). The number of protrusions 14 is larger than the order of flexural vibration excited in the elastic body 13, and displacement caused by flexural vibration excited by the piezoelectric element 12 is amplified at an extremity of each protrusion 14.

Although a travelling flexural vibration is excited in the elastic body 13, when focusing on only one of the protrusions 14, thrust-up vibration in a direction perpendicular to the contact surface with the driven element 15 and feed vibration in a direction parallel to the contact surface with the driven element 15 are combined, whereby the protrusion 14 is caused to perform elliptical vibration. Here, each protrusion 14 of the elastic body 13 and the driven element 15 are brought into pressure contact with each other by a pressing force applied by the pressing member 11. Therefore, a frictional driving force (thrust) in the circumferential direction is generated on the contact surface between the elastic body 13 and the driven element 15 by the elliptical motion excited at each protrusion 14, whereby it is possible to move (rotate) the elastic body 13 and the driven element 15 relative to each other by this frictional driving force.

Note that in the present embodiment, the pressing member 11 is fixed to the camera body 102 and is also joined to the piezoelectric element 12, whereby the driven element 15 is driven for rotation relative to the fixed vibration element (piezoelectric element 12 and elastic body 13).

The direction of driving (direction of rotating) the driven element 15 and the frictional driving force are changed by a phase difference $\Delta$ between the two-phased drive signals applied to the piezoelectric element 12. For example, assuming that the driving direction in a case where the phase difference $\Delta$ is in a range of 0 degrees<$\Delta$<180 degrees is a forward direction, in a case where the phase difference $\Delta$ is in a range of 0 degrees>$\Delta$>−180 degrees, the direction of the elliptical motion generated at each protrusion 14 is reversed, whereby the driving direction is reversed. In a state in which vibration is excited in the elastic body 13 by the drive signals having a predetermined phase difference $\Delta$ other than 0 degrees and ±180 degrees, as the amplitude of vibration excited in the elastic body 13 is larger, the component of feed vibration becomes larger, and hence the frictional driving force applied to the driven element 15 also becomes larger. When the phase difference $\Delta$ between the drive signals is substantially equal to ±90 degrees, the frictional driving force becomes the maximum.

On the other hand, in a case where the phase difference $\Delta$ is equal to 0 degrees or ±180 degrees, feed vibration is not generated at each protrusion 14, and flexural vibration is generated in the elastic body 13 as a standing wave of thrust-up vibration, and hence no thrust for driving the driven element 15 for rotation in the circumferential direction is generated. When such a standing wave is being generated, some of the plurality of protrusions 14 are repeatedly brought into contact with the driven element 15, and some are not brought into contact with the same. Further, the standing wave is different in the positional phase where it is generated, between the case where the phase difference $\Delta$ between the drive signals is equal to 0 degrees and the case where the same is equal to ±180 degrees.

The following description is given of an example in which the vibration actuator 1 is driven by the drive signals having a phase difference $\Delta$ in a range of −90 degrees≤$\Delta$≤0 degrees and a range of 0 degrees≤$\Delta$≤+90 degrees. However, the phase difference $\Delta$ between the drive signals is not limited to this, but the phase difference may be set to any desired one insofar as the phase difference can cause the driven element 15 to be driven for rotation.

The driven element 15 is joined to the operation member 3. Therefore, by driving the driven element 15 for rotation, it is possible to drive the operation member 3 for rotation. Since the elastic body 13 and the driven element 15 are in pressure contact with each other by the pressing force applied by the pressing member 11, a high holding torque is generated by a static frictional force in a state in which vibration is not excited in the elastic body 13. Therefore, it is not easy to manually rotate the operation member 3 joined to the driven element 15 (by externally applying a force thereto).

However, in a state in which thrust-up vibration components acting from the elastic body 13 on the driven element 15 are increased, the area where the elastic body 13 and the driven element 15 are in contact with each other is reduced and the contact time is also reduced, and hence the frictional holding force between the elastic body 13 and the driven element 15 becomes smaller than the static frictional force. Therefore, by adjusting an amplitude value of thrust-up vibration, it is possible to adjust the frictional holding force between the elastic body 13 and the driven element 15 as desired within a certain range, which makes it possible to manually rotate the operation member 3.

Figure 2:
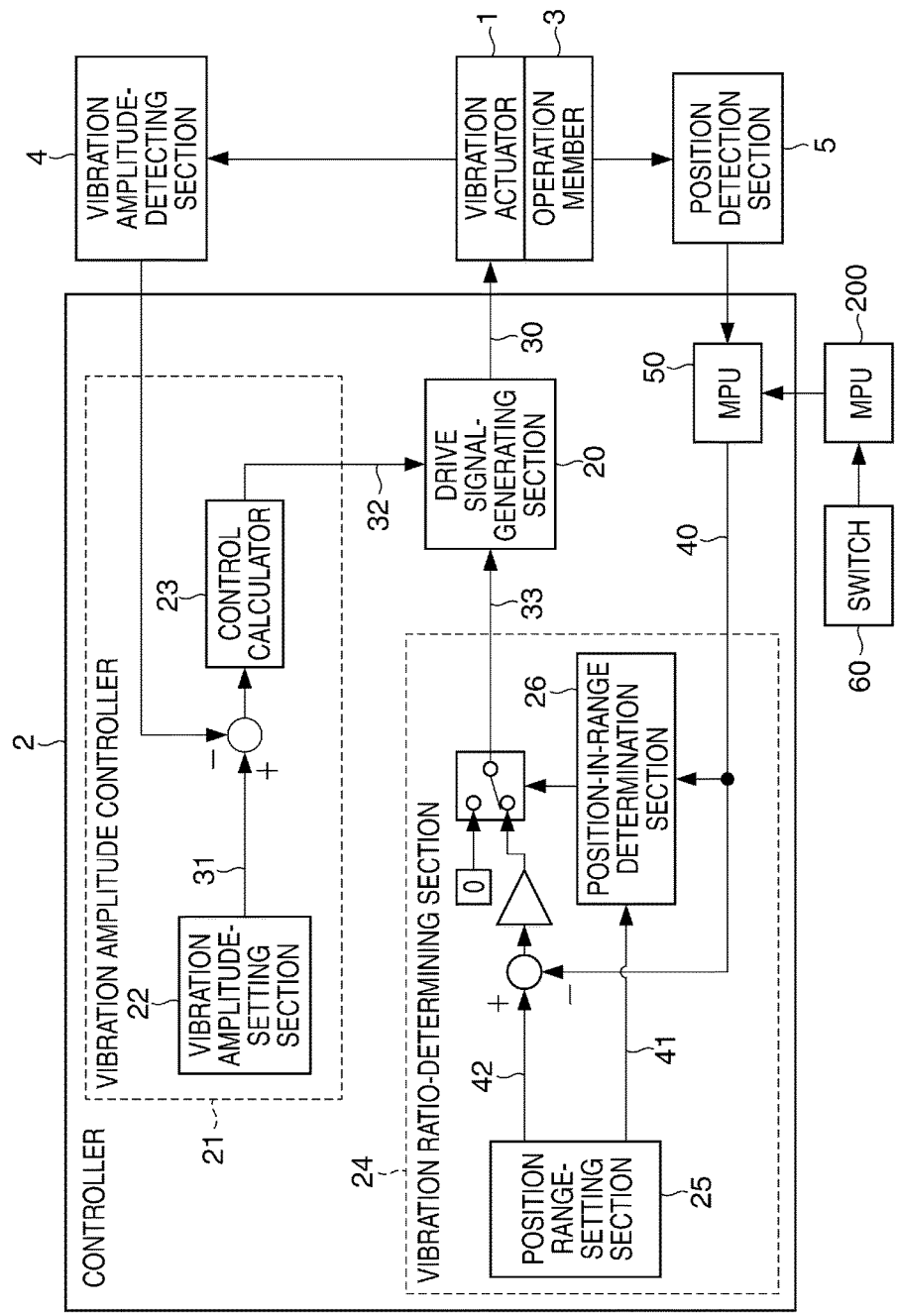
FIG. 2 is a schematic block diagram of a controller of the vibration drive device according to a first embodiment, included in the image pickup apparatus shown in FIG. 1.

Next, a description will be given of a controller that controls driving of the vibration actuator 1 of the vibration drive device according to the first embodiment. FIG. 2 is a schematic block diagram of the controller, denoted by reference numeral 2, which controls driving of the vibration actuator 1. The vibration actuator 1 and the controller 2 that controls driving of the vibration actuator 1 form the vibration drive device according to the first embodiment. The controller 2 is mounted e.g. at a predetermined location of the camera body 102. Therefore, the image pickup apparatus 100 includes the vibration drive device.

The controller 2 includes an MPU 50 that performs, though shown in FIG. 2 in a simplified manner, centralized control of the overall operation of the controller 2, a vibration amplitude controller 21, a vibration ratio-determining section 24, and a drive signal-generating section 20. The vibration amplitude controller 21 includes a vibration amplitude-setting section 22 and a control calculator 23. Further, the vibration ratio-determining section 24 includes a position range-setting section 25 and a position-in-range determination section 26. The sections included in the controller 2 can be realized by the following configuration. For example, processing operations performed by the vibration amplitude controller 21 and the vibration ratio-determining section 24 may be realized by a dedicated MPU, or may be realized by execution of a predetermined program by the MPU 50 of the controller 2 or a CPU included in the image pickup apparatus 100. Alternatively, the processing operations can also be realized by an FPGA or a logic circuit. The drive signal-generating section 20 is comprised of a circuit for generating a periodic signal and a circuit for boosting the periodic signal. The circuit for generating a periodic signal may be realized by the MPU, or may be realized by any of a CPU, a FPGA, an oscillation circuit, a VCO (voltage control transmitter), a pulse generation circuit, or the like. As the circuit for boosting the periodic signal, in a case where a periodic signal in the form of a digital pulse-like signal is used, the circuit can be realized by the circuit configuration in which the periodic signal is boosted by a circuit using a switching circuit and a transformer, and is output as a drive signal 30. Further, in a case where a periodic signal in the form of an analog sine wave is used e.g. by a VCO, the drive signal-generating section 20 can also be realized by the circuit configuration in which the periodic signal is boosted by a circuit using an amplifier and a transformer, and is output as the drive signal 30.

The vibration actuator 1 is provided with a vibration amplitude-detecting section 4, and a detection result output from the vibration amplitude-detecting section 4 is delivered to the vibration amplitude controller 21. The vibration amplitude-detecting section 4 is e.g. a piezoelectric element joined to a rear surface of the elastic body 13 in addition to the piezoelectric element 12, and detects a voltage generated by receiving stress corresponding to the vibration amplitude, as a signal indicative of the magnitude of the vibration amplitude excited in the elastic body 13. Note that one of the plurality of drive electrodes included in the piezoelectric element 12 can be used as an electrode of the vibration amplitude-detecting section 4 for vibration amplitude detection. A voltage generated at the electrode for vibration amplitude detection is an AC voltage, and hence by causing an AD converter to convert the voltage subjected to full-wave rectifying and smoothing to a numeric value, it is possible to use the AC voltage for processing operations performed by the MPU 50 of the controller 2. Alternatively, the AC voltage can be used for processing operations by determining an effective value of the AC voltage using an RMS-DC conversion circuit.

Although not shown in FIG. 1B, a position detection section 5 (see FIG. 2) that detects a rotational phase of the operation member 3 is provided in a space (see FIG. 1B) formed by the lens barrel 101 and the camera body 102. The position detection section 5 is e.g. a rotary encoder, and transmits a rotational phase detection signal to the MPU 50 of the controller 2. The MPU 50 of the controller 2 processes the rotational phase detection signal delivered from the position detection section 5 to determine a current position 40, and supplies the current position 40 to the vibration ratio-determining section 24. Note that the vibration amplitude-detecting section 4 and the position detection section 5 are illustrated in a manner not included in the controller 2 in FIG. 2, but can be included in the component elements of the controller 2, when their functions are taken into consideration. On the other hand, the vibration amplitude-detecting section 4 and the position detection section 5 can also be included not in the component elements of the controller 2, but in the component elements of the vibration actuator 1, when the positions where they are disposed are taken into consideration.

In the vibration amplitude controller 21, a difference between an output from the vibration amplitude-detecting section 4 and a target vibration amplitude 31 set by the vibration amplitude-setting section 22 is input to the control calculator 23. The control calculator 23 is e.g. a calculator that performs PID control, and generates an amplitude command value 32 of the drive signal 30 based on the input difference, and outputs the amplitude command value 32 to the drive signal-generating section 20.

The position-in-range determination section 26 of the vibration ratio-determining section 24 determines whether or not the current position 40 determined based on the rotational phase detection signal output from the position detection section 5 is within a driving section 41 (see FIGS. 3A and 3B) which is a predetermined position range set by the position range-setting section 25. Note that the current position 40 is information indicative of a relative position between the driven element 15 (operation member 3) and the vibration element (relative position of the driven element 15 with respect to the vibration element).

Then, the vibration ratio-determining section 24 determines a ratio of the feed vibration component, based on the result of determination performed by the position-in-range determination section 26, and outputs the determined ratio to the drive signal-generating section 20 as a vibration ratio command value 33. More specifically, in a case where the current position 40 is outside the driving section 41, the vibration ratio-determining section 24 sets the vibration ratio command value 33 to be output to 0. On the other hand, in a case where the current position 40 is within the driving section 41, the vibration ratio-determining section 24 outputs the vibration ratio command value 33 proportional to the difference between a target position 42 set by the position range-setting section 25 and the current position 40. A relationship between the driving section 41 and the target position 42, and the vibration ratio command value 33, will be described hereinafter with reference to FIGS. 3A and 3B.

The drive signal-generating section 20 generates the two-phased drive signals 30 based on the amplitude command value 32 and the vibration ratio command value 33 such that the temporal phase difference between the two-phased drive signals 30 is changed, and outputs the drive signals 30 to the piezoelectric element 12 of the vibration actuator 1. By applying the thus generated drive signals 30, the above-described vibration is excited in the elastic body 13 of the vibration actuator 1. For example, the drive signal-generating section 20 sets the phase difference to 0 when the vibration ratio command value 33 is equal to 0, to thereby cause only thrust-up vibration to be excited in the elastic body 13 without causing the feed vibration to be excited therein. Further, the drive signal-generating section 20 sets the phase difference Δ between the two-phased drive signals to a degree in a range of 0 to 90 degrees when the vibration ratio command value 33 is a positive value, and sets the same to a degree in a range of −90 to 0 degrees when the vibration ratio command value 33 is a negative value. At this time, the magnitude (absolute value) of the phase difference Δ is proportional to the magnitude of the vibration ratio command value 33. Further, the drive signal-generating section 20 changes one or both of the drive voltage and the driving frequency of the drive signals 30 according to the amplitude command value 32. In doing this, the drive signals 30 are basically controlled based on characteristics that as the drive voltage becomes higher, the vibration amplitude becomes larger, and as the driving frequency becomes higher, the vibration amplitude becomes smaller.

Outputting of the drive signals 30 can be started e.g. by turning on a predetermined switch 60 provided in the image pickup apparatus 100. For example, the configuration may be such that when an MPU 200 that controls the overall operation of the image pickup apparatus 100 detects turning-on of the predetermined switch 60, a control signal is sent from the MPU 200 to the MPU 50 of the controller 2, which causes the controller 2 to output the drive signals 30. With this configuration, outputting of the drive signals 30 is started immediately before an operator manually operates the operation member 3, which makes it possible to achieve power-saving, and further, it is possible to suppress wear of the contact surfaces of the elastic body 13 and the driven element 15.

This effect can also be obtained by the configuration in which outputting of the drive signals 30 is stopped based on the rotational phase detection signal output from the position detection section 5 during outputting of the drive signals 30. Further, this effect can also be obtained by the configuration in which outputting of the drive signals 30 is stopped in a case where it is determined that no operation has been performed for a predetermined time period, or in a case where the predetermined switch 60 is turned off. Note that outputting of the drive signals 30 may be started, not in response to the operation of the switch 60 or the like, but based on a detection result output from a pressure sensor that detects that the operation member 3 is held by hand, or an output from a sensor that detects that an external force in a rotational direction is applied to the operation member 3.

Figure 3A:
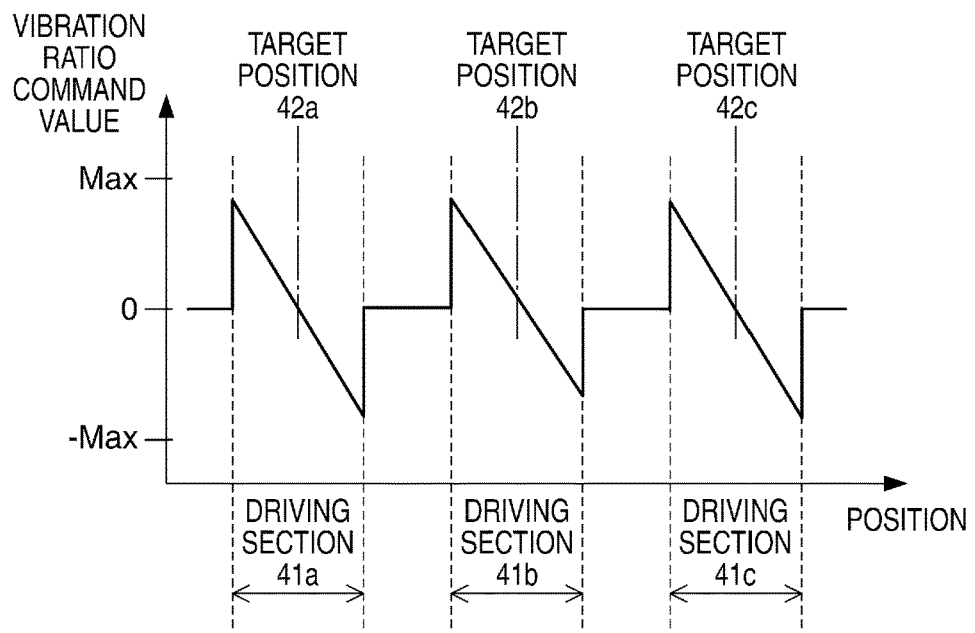
FIG. 3A is a graph showing a first example of a relationship between a driving section and a target position, and a vibration ratio command value, which is set by a vibration ratio-determining section included in the controller shown in FIG. 2.

FIG. 3A is a graph showing a first example of the relationship between the driving section 41 and the target position 42, and the vibration ratio command value 33, which is set in the vibration ratio-determining section 24. In the graph shown in FIG. 3A, the horizontal axis represents the rotational position of the operation member 3, and the vertical axis represents the vibration ratio command value 33. A value of "Max" on the vertical axis represents a maximum value of the vibration ratio command value 33 for generating a frictional driving force in the forward direction, and a value of "−Max" represents a maximum value of the vibration ratio command value 33 for generating a frictional driving force in the backward direction. When the vibration ratio command value 33 is a positive value, the frictional driving force in the forward direction is generated, and when the vibration ratio command value 33 is a negative value, the frictional driving force in the backward direction is generated. Note that although in the present example, "Max" and "−Max" represent the maximum values of the vibration ratio command value 33, when the operator desires to reduce a click feeling to be generated, these "Max" and "−Max" may be made smaller than the maximum values.

The position range-setting section 25 holds the driving section 41 and the target position 42 both in plurality. Each driving section 41 and each target position 42 associated therewith form a pair, and one target position 42 is set in one driving section 41 defined by a lower limit and an upper limit. FIG. 3A illustrates, by way of example, a target position 42a set in a driving section 41a, a target position 42b set in a driving section 41b, and a target position 42c set in a driving section 41c, but a target position is also set in each of driving sections, omitted from illustration in FIG. 3A. By thus setting the driving sections and the target positions, when the current position 40 is within the driving section 41b, for example, the vibration ratio command value 33 proportional to a difference between the current position 40 and the target position 42b is output from the vibration ratio-determining section 24.

Next, a description will be given of the control performed by the controller 2 and a sense of operation felt with fingers (hand) of the operator, when the operator manually rotates the operation member 3 in the forward direction.

In a case where the current position 40 is outside the driving section 41, the vibration ratio command value 33 is set to 0. In this state, the feed vibration component is 0, so that the frictional driving force for driving the driven element 15 for rotation is not generated, and hence the operation member 3 is not driven for rotation. On the other hand, thrust-up vibration is generated, and hence the frictional holding force acting between the elastic body 13 and the driven element 15 is reduced. Therefore, when the operator manually rotates the operation member 3, the operator can easily perform the rotating operation.

Next, in a case where the operation member 3 is rotated in the forward direction (first direction), thereby causing the current position 40 to enter one driving section 41 and move toward the target position 42, but the target position 42 has not been reached, the vibration ratio-determining section 24 sets the positive vibration ratio command value 33 for the drive signal-generating section 20. As a result, the frictional driving force for driving the operation member 3 in the forward direction (the same direction as a direction of moving the operation member 3 by the manual operation) is generated on the operation member 3, whereby a sense of operation of the operation member 3 being drawn toward the target position 42 is felt by the hand of the operator who is manually operating the operation member 3.

In a case where the operation member 3 is further manually operated by the operator in the forward direction, thereby causing the current position 40 to pass the target portion 42 within the driving section 41 and further move away from the target position 42, the vibration ratio-determining section 24 sets the negative vibration ratio command value 33. This causes the frictional driving force for driving the operation member 3 in the opposite direction (second direction) opposite to the forward direction (first direction) which is the direction of manually rotating the operation member 3 is generated on the operation member 3, whereby a repulsion force can be felt by the hand of the operator manually operating the operation member 3. As the current position 40 is moved farther away from the target position 42, this repulsion force is felt more strongly.

As described above, the direction of generating the frictional driving force applied to the driven element 15 that causes the operation member 3 to rotate in unison with the driven element 15 is switched based on the relationship between the current position 40 and the target position 42 in the driving section 41, whereby the current position 40 is caused to coincide with the target position 42. With this, a change in torque applied to the operation member 3 gives a click feeling to the hand of the operator. Further, when the operator releases the operator's hand from the operation member 3 when within the driving section 41, the operation member 3 is automatically positioned at the target position 42 by the controller 2 that controls driving of the vibration actuator 1. This prevents a problem that the operation member 3 stops at a halfway position. Further, as shown in FIG. 3A, by arranging the driving sections 41 each for providing a click feeling at predetermined intervals, it is possible to sequentially give a click feeling to the operator in proportion to an amount of operation performed on the operation member 3 by the operator.

Note that a host controller of the position range-setting section 25 and the vibration amplitude-setting section 22 can set and change the driving section 41 and the target position 42, via the position range-setting section 25, and the target vibration amplitude 31, via the vibration amplitude-setting section 22. An example of the host controller is the MPU 200 that controls the overall operation of the image pickup apparatus 100. This makes it possible to adjust the generation interval and intensity of a click feeling and the amount of reduction of the frictional holding force in a state in which the vibration ratio command value 33 is equal to 0, according to each of the photographing parameters, the photographing mode, and so forth, which is to be set by the operation member 3, whereby it is possible to obtain great convenience and an excellent operation feeling.

Figure 3B:
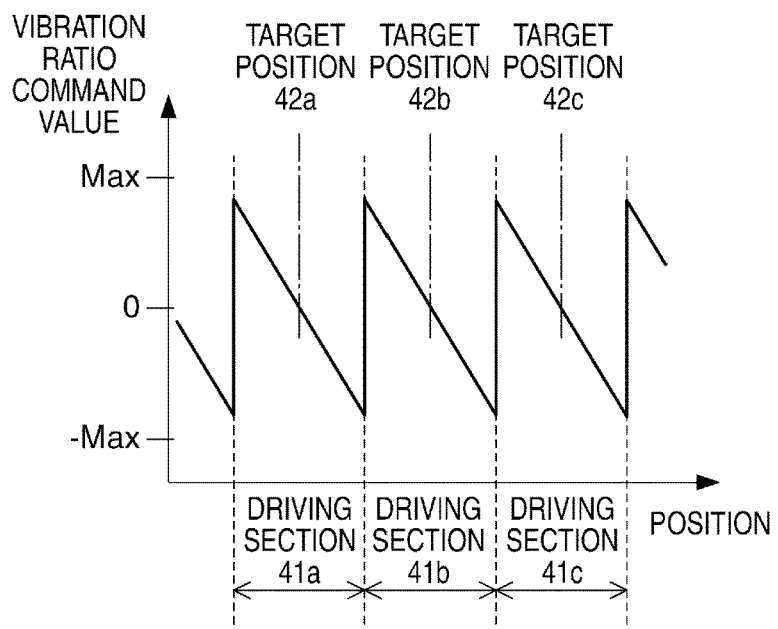
FIG. 3B is a graph showing a second example of the relationship set between the driving section and the target position, and the vibration ratio command value.

Further, although in FIG. 3A, the section in which the vibration ratio command value 33 is equal to 0 is provided between each adjacent ones of the driving sections 41, this section is not necessarily required to be provided. FIG. 3B is a graph showing a second example of the relationship between the driving section 41 and the target position 42, and the vibration ratio command value 33, which is set in the vibration ratio-determining section 24. As shown in FIG. 3B, the plurality of driving sections 41 may be provided in a continuous manner without any interposed section therebetween.

Although in the above description, the vibration ratio command value 33 is changed in proportion to a distance between the target position 42 and the current position 40, it is also desirable to provide an allowable range in which the vibration ratio command value 33 is set to 0 in the vicinity of the target position 42. This is for the following reason: In such a case where the frictional driving force applied to the driven element 15 by the vibration element (elastic body 13) is large and a case where an inertial load is large in the vibration actuator 1, there is a possibility that the operation member 3 is not stopped at the target position 42, but is repeatedly moved forward or backward of the target position 42. In this case, a vibrational reciprocating motion of the operation member 3 occurs, so that the operator sometimes feels, with his/her fingers, not a click feeling, but a vibration.

Figure 4A:
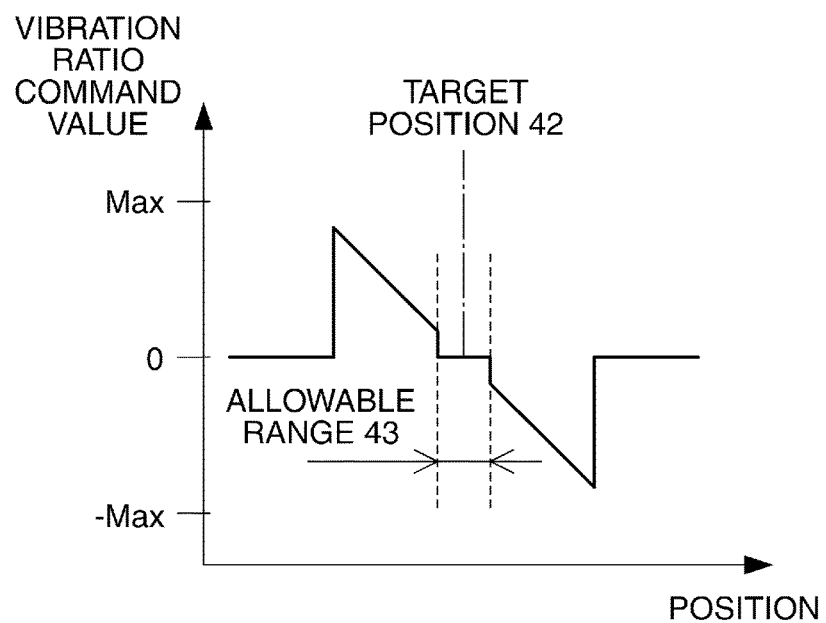
FIG. 4A is a diagram showing one setting example of a case where an allowable range having the vibration ratio command value set to 0 is provided in the vicinity of the target position appearing in FIG. 3A or 3B.
Figure 4B:
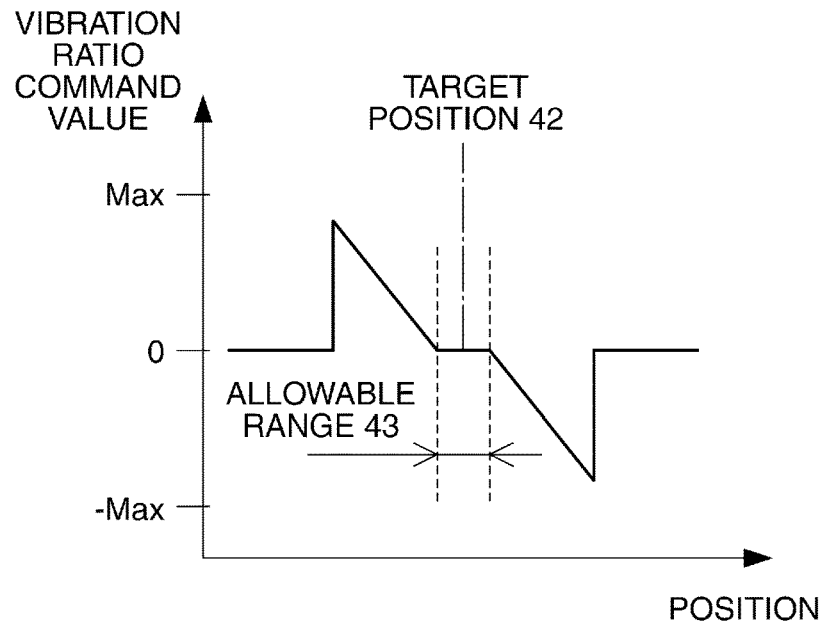
FIG. 4B is a diagram showing another setting example of the case where the allowable range is provided.

FIGS. 4A and 4B are diagrams each showing one setting example of a case where an allowable range 43 having the vibration ratio command value 33 set to 0 is provided in the vicinity of the target position 42. By setting the allowable range as shown in FIG. 4A, when the current position 40 is in the allowable range 43, the frictional driving force applied to the driven element 15 by the vibration element (elastic body 13) is not generated, which prevents a vibrational motion of the operation member 3 from being generated. Further, as shown in FIG. 4B, even when a form in which the vibration ratio command value 33 is proportionally changed from each of opposite bounds of the allowable range 43 (point where the current position goes out of the allowable range 43) is employed, similarly, a vibrational motion of the operation member 3 is not caused. This makes it possible to prevent a vibrational reciprocating motion from being generated in the operation member 3. Note that the allowable range 43 is set e.g. by the position range-setting section 25.

Figure 5A:
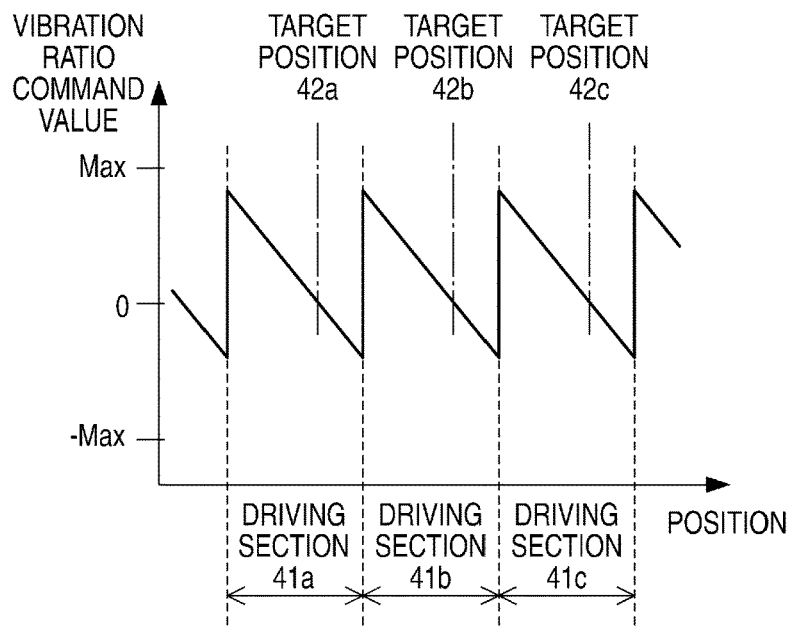
FIG. 5A is a graph showing a third example of the relationship set between the driving section and the target position, and the vibration ratio command value.
Figure 5B:
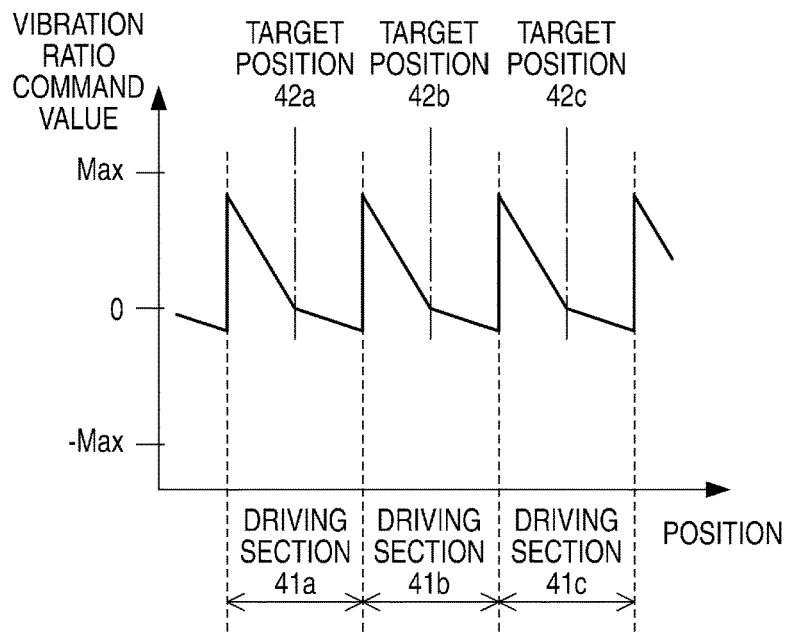
FIG. 5B is a graph showing a fourth example of the relationship set between the driving section and the target position, and the vibration ratio command value.
Figure 5C:
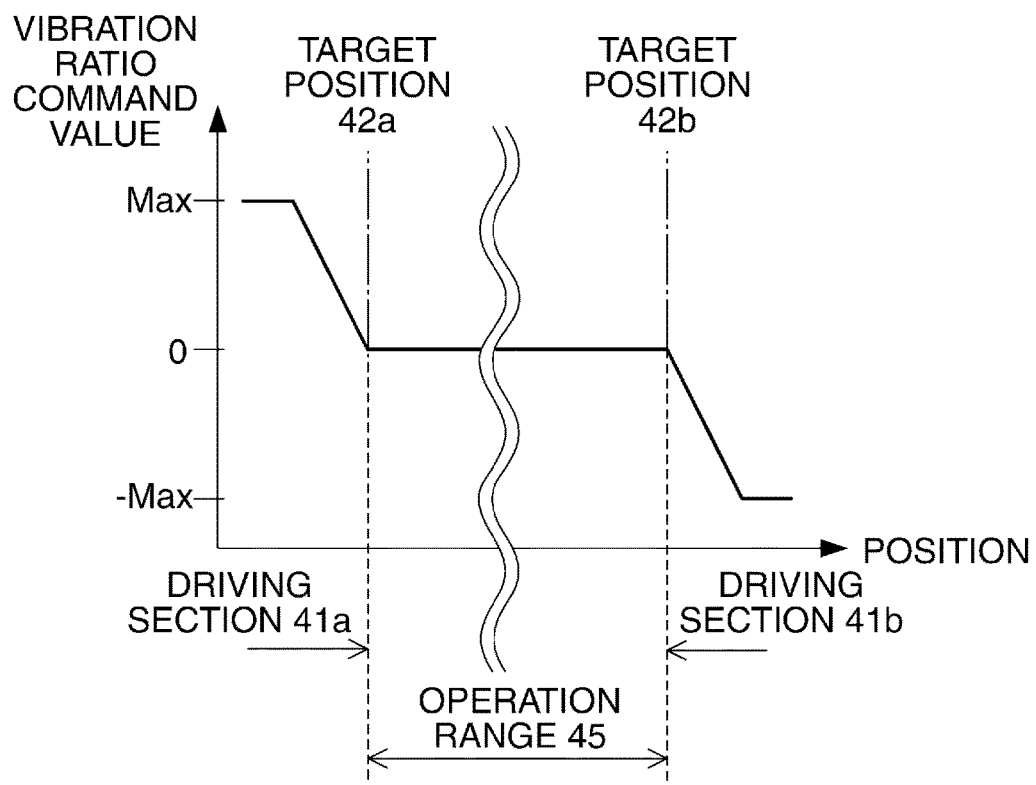
FIG. 5C is a graph showing a fifth example of the relationship set between the driving section and the target position, and the vibration ratio command value.

Although in the above description, as shown in FIGS. 3A and 3B, and 4A and 4B, the target position 42 is set in the center of the driving section 41, and the vibration ratio command value 33 is contrastingly set in proportion to the distance from the target position 42, the method of setting the target position 42 is not limited to this. FIGS. 5A, 5B, and 5C are graphs showing a third example, a fourth example, and a fifth example of the relationship between the driving section 41 and the target position 42, and the vibration ratio command value 33, which is set in the vibration ratio-determining section 24.

As shown in the third example in FIG. 5A, the target positions 42 (target positions 42a, 42b, 42c, . . . ) may be each set to a position which is shifted from the center of an associated one of the driving section 41s (driving sections 41a, 41b, 41c, . . . ) within the range of the driving section 41. Further, as shown in the fourth example in FIG. 5B, gradient of the vibration ratio command value 33 may be changed before and after the target position 42. This setting can give the operator a sense of operation in which the manual rotation of the operation member 3 in the forward direction is easy to perform, but the manual rotation of the same in the backward direction produces such a strong repulsion force as produced by a ratchet.

As shown in the fifth example in FIG. 5C, the driving sections 41 (driving sections 41a and 41b) may be set immediately outside opposite ends of a wide operation range 45, respectively, and the target positions 42 (target positions 42a and 42b) may be set at respective boundaries between the operation range 45 and the driving sections 41. In this case, when the current position 40 moves from the target position 42a or 42b into the driving section 41 associated therewith, it is possible to generate only a force that presses the operation member 3 back from the driving section 41. Therefore, the operator can feel a sense of repulsion as if the operation member 3 is brought into abutment with a virtual obstacle. Therefore, the fifth example is preferable to be applied to the upper limit value and the lower limit value of a photographing parameter for use in changing a photographing parameter by rotating the operation member 3. That is, only a repulsion force is generated when a setting of the photographing parameter which the operator is attempting to make by manually rotating the operation member 3 reaches the upper limit value or the lower limit value thereof, whereby the operator can know that the operation member 3 has reached an end of an operable range within which the setting should be made.

Note that the frictional driving force which can be output by the vibration actuator 1 has a limit. Therefore, the configuration may be, for example, such that in a case where the operation member 3 is rotated by the operator with an excessive force that is larger than the repulsion force, the vibration actuator 1 is locked by stopping the drive signal. Whether the operation member 3 is operated for rotation with an excessive force can be easily determined based on a relationship between the driving section 41 and the current position 40.

Figure 6A:
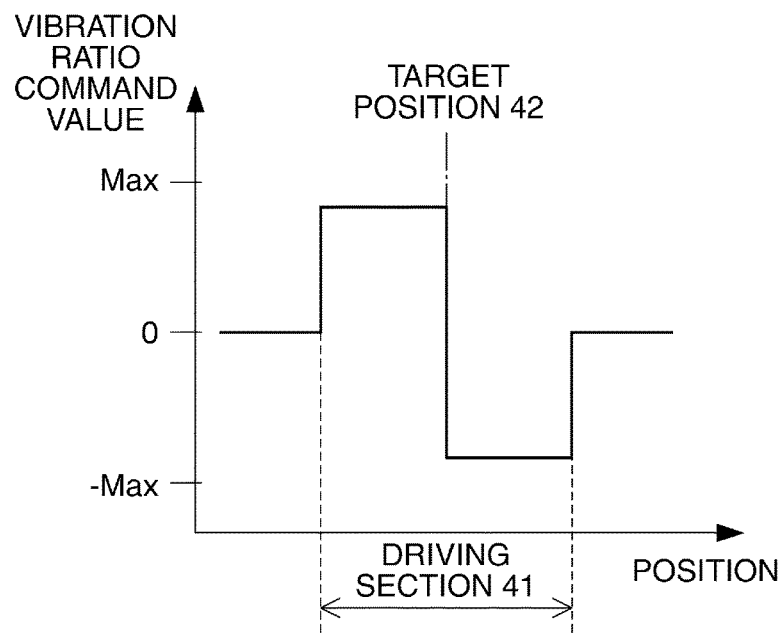
FIG. 6A is a graph showing a sixth example of the relationship set between the driving section and the target position, and the vibration ratio command value.
Figure 6B:
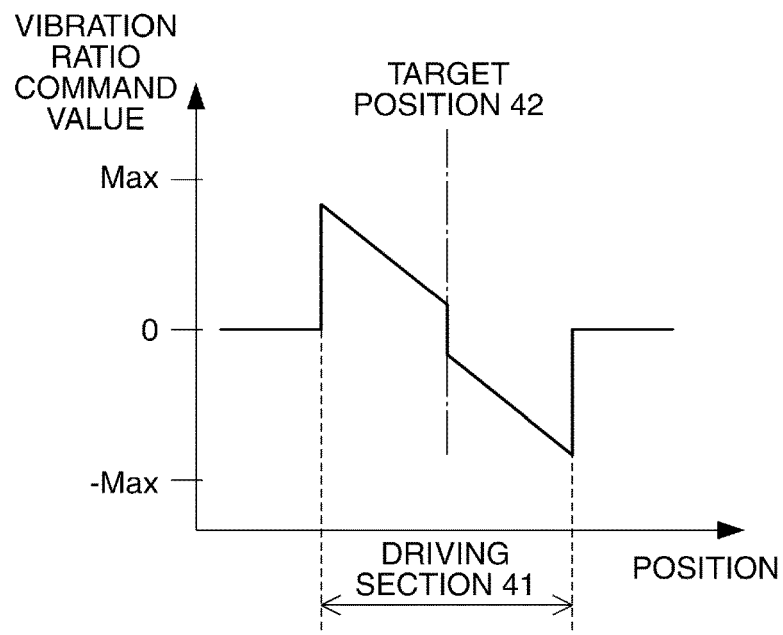
FIG. 6B is a graph showing a seventh example of the relationship set between the driving section and the target position, and the vibration ratio command value.

Although in the first to fifth examples shown in FIGS. 3A and 3B and FIGS. 5A to 5C, the vibration ratio command value 33 proportional to the difference between the target position 42 and the current position 40 is output, the method of setting the vibration ratio command value 33 is not limited to these. FIGS. 6A and 6B are graphs showing a sixth example and a seventh example of the relationship between the driving section 41 and the target position 42, and the vibration ratio command value 33, which is set in the vibration ratio-determining section 24.

In the sixth example in FIG. 6A, one of the three values of 0, a positive value, and a negative value is output as the vibration ratio command value 33 depending on whether the current position 40 is within or outside the driving section 41, and the difference of the current position 40 from the target position 42 is positive or negative. Further, a table of the vibration ratio command value 33 may be created based on such an index that makes the frictional driving force substantially constant with respect to the position of the driven element 15, and the vibration ratio command value 33 may be determined based on the difference between the target position 42 and the current position 40, and the table. Further, as shown in the seventh example in FIG. 6B, compared with first example shown in FIG. 3A, the vibration ratio command value 33 may be partially discontinuously changed within the driving section 41. For example, in a case where the frictional driving force generated when the vibration ratio command value 33 is close to 0 becomes too small, the improvement of the frictional driving force is expected by using the seventh example.

Although in the above description, the drive signal-generating section 20 changes the temporal phase difference Δ between the two-phased drive signals based on the vibration ratio command value 33 input from the vibration ratio-determining section 24, the method of generating the two-phased drive signals is not limited to this. For example, there may be adopted a method in which the temporal phase difference Δ between the two-phased drive signals 30 is fixed to 90 degrees, and an amplitude value of one of the two-phased drive signals 30 is controlled. In this case, when the amplitude of the one of the drive signals is set to 0, only a thrust-up vibration component is generated in the elastic body 13. Further, when the amplitude of the one of the drive signals is set to a positive value, feed vibration in the forward direction can be generated, and when the direction of the amplitude of the same is reversed, feed vibration in the backward direction can be generated.

The method of generating a thrust-up vibration component is not limited to the method of setting the phase difference Δ between the two-phased drive signals 30 to 0 degrees, but as described above, the phase difference Δ may be set to ±180 degrees. Further, portions of the elastic body 13 along the circumference at which thrust-up vibration is generated can be selectively changed between the case where the phase difference Δ is set to 0 degrees and the case where the phase difference Δ is set to ±180 degrees. Therefore, by periodically changing the phase difference Δ, it is possible to prevent wear from being increasingly caused at only specific portions of the elastic body 13 and the driven element 15 along the circumference. Further, by reducing the amplitude of the two-phased drive signals 30 or increasing the driving frequency, it is possible to reduce the vibration amplitude of the elastic body 13, and hence by using this method in combination, it is possible to adjust the frictional driving force applied to the driven element 15.

Although in the above-described embodiment, the vibration amplitude-detecting section 4 is implemented by a piezoelectric element provided in addition to the piezoelectric element 12, or by an additional electrode provided on the piezoelectric element 12 for vibration detection, the magnitude of vibration excited in the elastic body 13 may be detected using other methods. For example, the vibration amplitude may be detected by a method of detecting a mechanical vibration component of current flowing into the piezoelectric element 12, a method using a known strain gauge, or an optical detection method.

Further, although in the above-described embodiment, the vibration amplitude excited in the elastic body 13 is controlled using the detection result output from the vibration amplitude-detecting section 4, the vibration amplitude excited in the elastic body 13 can be controlled without using the vibration amplitude-detecting section 4. For example, a table defining a relationship between the driving frequency and the vibration amplitude corresponding to the drive voltage may be prepared in advance, and the two-phased drive signals 30 may be generated based on the table and the target vibration amplitude 31.

However, by controlling the vibration amplitude excited in the elastic body 13 using the vibration amplitude-detecting section 4, it is possible to stabilize the degree of change in the frictional holding force generated between the elastic body 13 and the driven element 15. For example, in the case of the vibration actuator 1 having an annular shape, a state of contact between the elastic body 13 and the driven element 15 sometimes changes with a change in the relative position therebetween in the circumferential direction due to processing accuracy and assembling accuracy of components, and the like. Further, the driving characteristics of the vibration actuator 1 change with an environmental temperature, and hence when the image pickup apparatus 100 is used e.g. in a place where the temperature largely changes, the state of contact between the elastic body 13 and the driven element 15 changes. When the state of contact between the elastic body 13 and the driven element 15 thus changes, the vibration characteristics of the elastic body 13 change, causing a change in the vibration amplitude. As a result, the magnitude of the frictional holding force changes depending on the position of the operation member 3, whereby a load sensed by the operator with his/her hand sometimes changes. To eliminate this inconvenience, this variation in load is reduced by controlling the vibration amplitude excited in the elastic body 13. This makes it possible, when the operator rotates the operation member 3, to prevent the operator from erroneously recognizing that the current position 40 has reached the target position 42 even though the current position 40 has not reached the target position 42 yet.

Although in the above description, the control for changing the target vibration amplitude 31 is not performed, the control for changing the target vibration amplitude 31 may be performed by inputting the output signal from the position-in-range determination section 26 to the vibration amplitude-setting section 22, and changing the target vibration amplitude 31 only when the current position 40 has entered the driving section 41. For example, in a case where it is desired to make the operator feel a certain load on the manual operation when the current position 40 is outside the driving section 41, it is desirable to suppress reduction of the frictional holding force by reducing the target vibration amplitude 31. In this case, the amplitude of vibration excited in the elastic body 13 is small, and hence even when the phase difference Δ between the two-phased drive signals 30 is set to 90 degrees, only a small driving force is generated. That is, even when the current position 40 enters the driving section 41, if the vibration amplitude is fixed, a sufficient frictional driving force applied to the driven element 15 is not generated, which gives only a weak click feeling. To eliminate this inconvenience, by increasing the target vibration amplitude 31 when the current position 40 enters the driving section 41, the frictional driving force applied to the driven element 15 is temporarily increased. This makes it possible to give a clear click feeling to the operator. Further, when the current position 40 goes out of the driving section 41, the target vibration amplitude 31 is returned to the original value, whereby it is possible to return the sense of operation to the one with a load.

In the above description, the image pickup apparatus 100 has the configuration in which the piezoelectric element 12 and the elastic body 13 of the vibration actuator 1 are fixed to the camera body 102 via the pressing member 11, and the operation member 3 joined to the driven element 15 is arranged in a rotatable manner. In this case, the driven element 15 and the operation member 3 may be integrally formed of the same material as a single unit. Further, the piezoelectric element 12 and the elastic body 13 may be formed of the same material, i.e. piezoelectric ceramics. Further, the driven element 15 and the operation member 3 are not necessarily required to be joined to each other, but the rotatable piezoelectric element 12 and the elastic body 13 may be joined to the operation member 3, and the driven element 15 may be fixed to the camera body 102. In this case, the driven element 15 and the camera body 102 may be integrally formed of the same material as a single unit. The vibration actuator 1 and the operation member 3 are not necessarily required to be directly joined to each other as shown in the present embodiment, but may be indirectly connected to each other via another member or a transmission mechanism.

The vibration actuator used in the image pickup apparatus 100 is not limited to the one including the elastic body 13 having an annular shape. Here, a description will be given of two variations of the vibration actuator of the vibration drive device that can be applied to the operation member 3 included in the image pickup apparatus 100 with reference to FIGS. 7A to 7C, and 8A to 8C. Note that a vibration element shown in FIGS. 7A to 7C is disclosed e.g. in Japanese Patent Laid-Open Publication No. 2004-320846, and a vibration element shown in FIGS. 8A to 8C is disclosed e.g. in Japanese Patent Laid-Open Publication No. H08-237971.

Figure 7A:
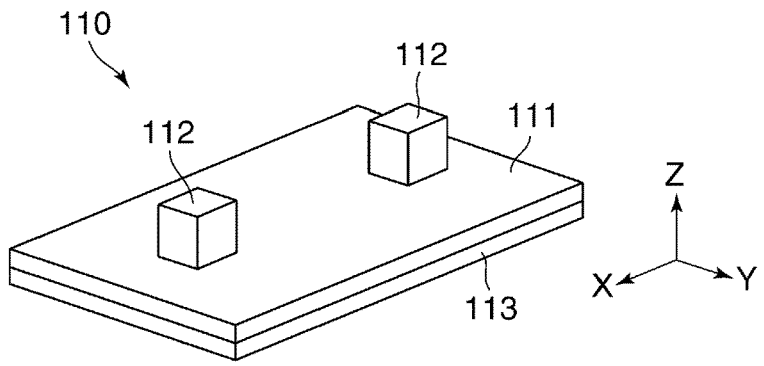
FIG. 7A is a schematic perspective view of a vibration element as a component of a first variation of the vibration actuator of the vibration drive device according to the first embodiment.
Figure 7B:
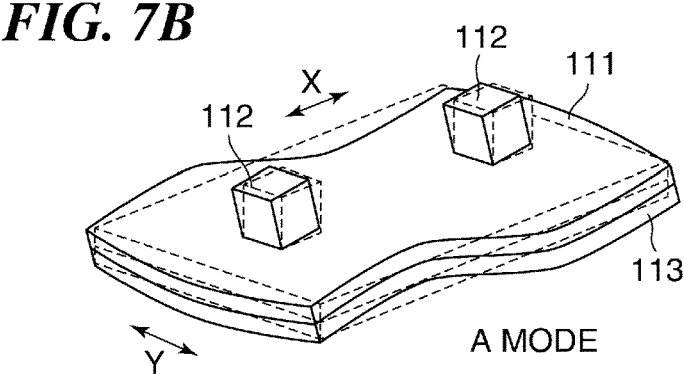
FIG. 7B is a diagram useful in explaining a vibration mode excited in the vibration element as the component of the first variation of the vibration actuator.
Figure 7C:
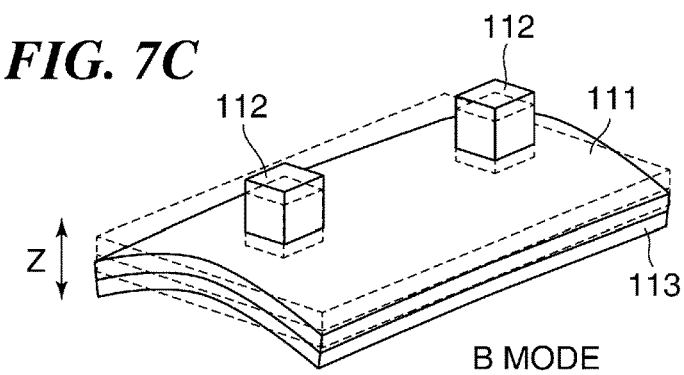
FIG. 7C is a diagram useful in explaining another vibration mode excited in the vibration element.
Figure 8A:
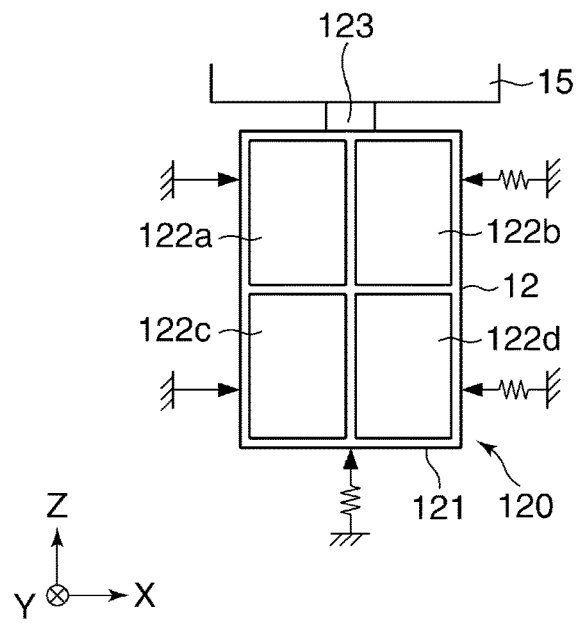
FIG. 8A is a schematic diagram of a second variation of the vibration actuator of the vibration drive device according to the first embodiment.
Figure 8B:
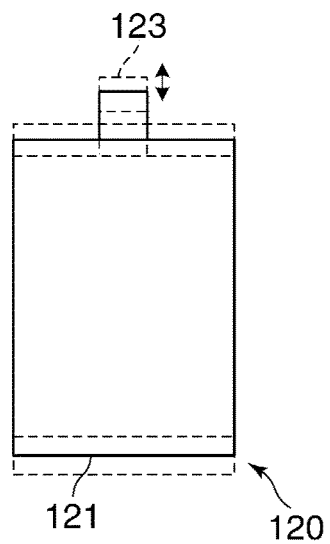
FIG. 8B is a diagram useful in explaining a vibration mode excited in the vibration element as the component of the second variation of the vibration actuator.
Figure 8C:
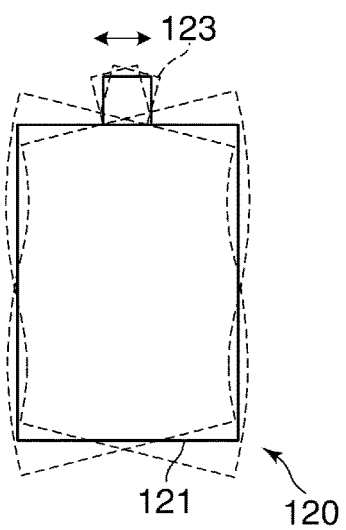
FIG. 8C is a diagram useful in explaining another vibration mode excited in the vibration element.

FIG. 7A is a schematic perspective view of a vibration element 110 as a component of a first variation of the vibration actuator of the vibration drive device that can be applied to the operation member 3 included in the image pickup apparatus 100. Note that a three-dimensional Cartesian coordinate system is set to the vibration element 110 for the purpose of explanation, as shown in FIG. 7A.

The vibration element 110 includes an elastic body 111 having a plate shape, two protrusions 112 provided on one X-Y surface of the elastic body 111, and a piezoelectric element 113 joined to the other X-Y surface of the elastic body 111. The vibration element 110 and the driven element 15 (not shown in FIG. 7A) are pressed and held by pressing means, not shown, in a Z direction in a state in which upper surfaces of the two protrusions 112 and the driven element 15 are in contact with each other.

Although not shown, the piezoelectric element 113 has a structure in which two drive electrodes which are equally divided in an X direction are formed on one X-Y surface of the piezoelectric ceramics, and a full-surface electrode is formed on the other X-Y surface of the same. By applying an AC voltage to each drive electrode, it is possible to excite vibration in two flexural vibration modes shown in FIGS. 7B and 7C.

FIGS. 7B and 7C are diagrams useful in explaining the two flexural vibration modes which are two types of driving vibration excited in the elastic body 111. One of the flexural vibration modes shown in FIG. 7B (hereinafter referred to as the "A mode") is a second-order flexural vibration in the X direction which is a direction of the long side of the elastic body 111, and has three nodes parallel to a Y direction which is a direction of the short side of the same. The two protrusions 112 are each formed in the vicinity of a location where a node of vibration is formed in the A mode, and each performs a reciprocal motion in the X direction by vibration in the A mode. The vibration in the A mode corresponds to the above-described feed vibration generated by the piezoelectric element 12 of the vibration actuator 1.

The other vibration mode shown in FIG. 7C (hereinafter referred to as the "B mode") is a first-order flexural vibration in the Y direction which is the direction of the short side of the elastic body 111, and has two nodes parallel to the X direction which is the direction of the long side of the same. A line connecting the nodes in the A mode and a line connecting the nodes in the B mode are substantially orthogonal to each other in the X-Y surface. The two protrusions 112 are each arranged in the vicinity of a position of an antinode of the vibration in the B mode, and each perform a reciprocal motion in the Z direction by vibration in the B mode. The vibration in the B mode corresponds to the above-described thrust-up vibration generated by the piezoelectric element 12 of the vibration actuator 1.

In the vibration element 110, the respective vibrations in the A mode and the B mode are generated with a predetermined phase difference to thereby generate an elliptical motion (or circular motion) at the extremity of each protrusion 112. That is, thrust-up vibration and feed vibration are excited and combined by the two different vibration modes, whereby the elliptical motion or the circular motion is generated.

For example, the three vibration elements 110 are arranged at equally-spaced intervals in the circumferential direction of the driven element 15 such that the protrusions 112 of the three vibration elements 110 are on the same circumference and are in contact with the driven element 15, and these three vibration elements 110 are fixed to the camera body 102 via pressing means. In each vibration element 110, when the phase difference between the drive signals is set to 0, feed vibration (A mode) is not generated, but only thrust-up vibration (B mode) is generated at the two protrusions 112, and it is possible to reduce the frictional holding force acting between the vibration elements 110 and the driven element 15 in this state. Further, by setting the phase difference between the drive signals to a value in the range of 0 to 180 degrees (exclusive of 0 degrees and 180 degrees) to cause an elliptical motion to be generated at each protrusion 112, the driven element 15 receives the frictional driving force from the protrusions 112, and is driven for rotation. Assuming that the rotational direction at this time is the forward direction, when the phase difference between the drive signals is set to a value in the range of 0 to −180 degrees (exclusive of 0 degrees and −180 degrees), an elliptical motion is generated at each protrusion 112 in the backward direction, whereby it is possible to drive the driven element 15 for rotation in the backward direction.

In each vibration element 110, as the absolute value of the phase difference between the drive signals becomes larger, a ratio of the amplitude of feed vibration (A mode) to the amplitude of thrust-up vibration (B mode) becomes larger. Further, by changing the voltage value and frequency of the drive signal to change the vibration amplitude, it is possible to change the frictional driving force applied to the driven element 15 to change the rotational speed.

Thus, also in the case where the vibration actuator provided with the vibration elements 110 is used, similarly to the case where the vibration actuator 1 is used, it is possible to give a click feeling when the operation member 3 is manually rotated. More specifically, in this case, it is only required that the phase difference between the two-phased drive signals is controlled by the drive signal-generating section 20 based on the vibration ratio command value 33.

FIG. 8A is a schematic diagram of a second variation of the vibration actuator of the vibration drive device according to the first embodiment, which can be applied to the operation member 3 included in the image pickup apparatus 100. Note that a three-dimensional Cartesian coordinate system is set to the vibration element 120 of the present variation for the purpose of explanation, as shown in FIG. 8A.

The vibration element 120 includes a piezoelectric element 121, and an elastic body 123 provided on one X-Y surface of the piezoelectric element 121, and the elastic body 123 is brought into pressure contact with the driven element 15 by pressing means, not shown. The piezoelectric element 121 has a structure in which one Z-X surface of the piezoelectric ceramics is formed with four drive electrodes 122a, 122b, 122c, and 122d, which are equally divided therebetween in the X direction and Z direction, respectively, and the other Z-X surface, not shown, is formed with a full-surface electrode (common electrode).

In-phase drive signals are input to a pair of the drive electrodes 122a and 122d, which are diagonally positioned. Further, drive signals each having a predetermined phase difference (including 0 degrees) from the drive signals input to the drive electrodes 122a and 122d are input to another pair of the drive electrodes 122b and 122c, which are diagonally positioned. FIG. 8B is a diagram useful in explaining vibration (displacement) excited in the elastic body 123 when in-phase AC voltages (drive voltages of the drive signals) are applied to the two pairs of the drive electrodes. In this case, thrust-up vibration in the Z direction is generated in the elastic body 123. FIG. 8C is a diagram useful in explaining vibration (displacement) excited in the elastic body 123 when opposite-phase AC voltages are applied to the two pairs of the drive electrodes, respectively. In this case, feed vibration in the X direction is generated in the elastic body 123. Therefore, also in the vibration element 120, by applying AC voltages having a predetermined phase difference to the two pairs of drive electrodes to generate thrust-up vibration and feed vibration by the two different vibration modes, with temporal phase differences, it is possible to generate an elliptical motion in the elastic body 123. Thus, it is possible to frictionally drive the driven element 15, and by controlling the direction of the phase difference between the AC voltages applied to the two pairs of the drive electrodes and the magnitude of the vibration amplitude at this time, it is possible to adjust the driving direction, driving speed, and magnitude of the frictional driving force applied to the driven element 15.

As described above, by constructing the vibration actuator using either of the vibration element 110 shown in FIGS. 7A to 7C, and the vibration element 120 shown in FIGS. 8A to 8C, and controlling the phase difference between the drive signals to drive the driven element 15, it is possible to generate a click feeling when the operation member 3 is manually rotated.

Note that a vibration actuator including a first piezoelectric element that generates torsional vibration (feed vibration), and a second piezoelectric element that generates vertical vibration (thrust-up vibration) for controlling the contact between the elastic body 13 and the driven element 15 may be used in place of the above-described vibration actuators. This vibration actuator is disclosed in e.g. Japanese Patent Laid-Open Publication No. H05-083961.

In this vibration actuator, thrust-up vibration and feed vibration are excited by piezoelectric elements independent of each other, respectively, and the drive signals with a temporal phase difference of 90 degrees therebetween are input to the piezoelectric elements, respectively, so as to generate torsional vibration when the elastic body 13 is fully extended during vertical vibration. In this case, by controlling the amplitude of the drive signal input to the piezoelectric element that excites torsional vibration, it is possible to generate a click feeling when the operation member 3 is manually rotated.

More specifically, when the vibration ratio command value 33 is a positive value, a drive signal, which has a phase difference of 90 degrees from a drive signal applied to the piezoelectric element that excites thrust-up vibration, and an amplitude proportional to the vibration ratio command value 33, is applied to the piezoelectric element that excites torsional vibration. Further, when the vibration ratio command value 33 is a negative value, a drive signal, which has a phase difference of −90 degrees from the drive signal applied to the piezoelectric element that excites thrust-up vibration, and an amplitude proportional to the vibration ratio command value 33, is applied to the piezoelectric element that excites torsional vibration. This makes it possible to drive the driven element 15 with the frictional driving force based on the vibration ratio command value 33, and therefore, it is possible to generate a click feeling when the operation member 3 is manually rotated. Note that setting the phase difference between the drive signals to −90 degrees has the same effect as changing the magnitude of the amplitude from a plus range to a minus range with the phase difference fixed to 90 degrees.

Next, a description will be given of a controller that controls driving of the vibration actuator 1 of the vibration drive device according to a second embodiment of the present invention. FIG. 9 is a schematic block diagram of the controller, denoted by reference numeral 2A, which controls driving of the vibration actuator 1. The controller 2A differs from the controller 2 of the vibration drive device according to the first embodiment in that a stop detection section 27 is provided. The stop detection section 27 may be realized by an dedicated MPU or may be realized by execution of a predetermined program by the CPU.

In the controller 2A, the stop detection section 27 detects the stop of the driven element 15 (operation member 3) based on a stop detection section 44 set by the position range-setting section 25 and the current position 40 determined by the MPU 50 based on the rotational phase detection signal output from the position detection section 5. Then, the stop detection section 27 outputs a stop detection signal to the drive signal-generating section 20, and the drive signal-generating section 20 stops generation of the drive signal 30 based on the received stop detection signal.

Figure 10:
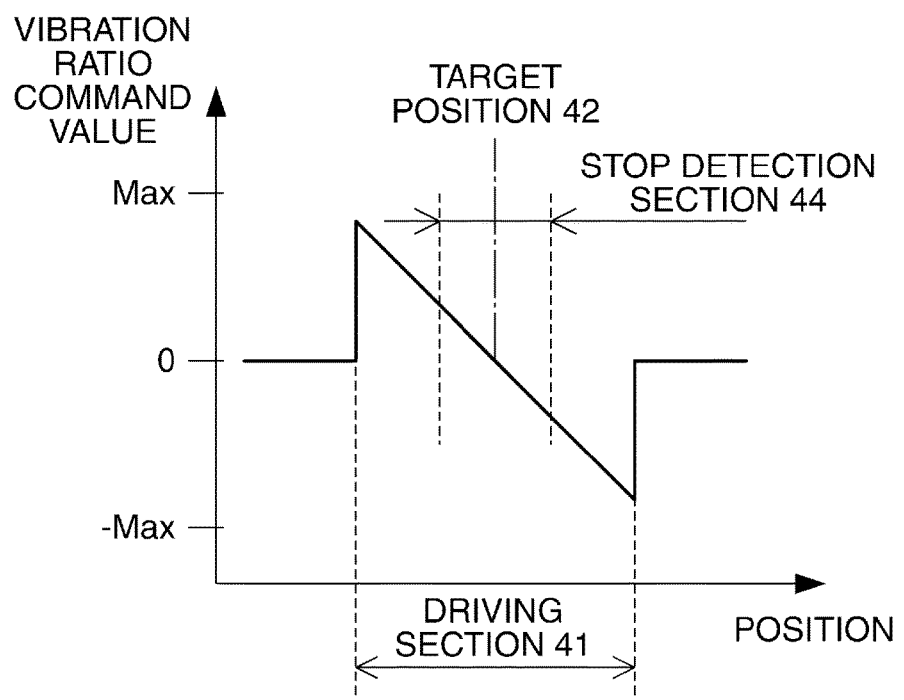
FIG. 10 is a graph showing a relationship between a driving section, a target position, and a stop detection section, and a vibration ratio command value, which is set by the controller shown in FIG. 9.

FIG. 10 is a graph showing a relationship between the driving section 41, the target position 42, and the stop detection section 44, and the vibration ratio command value 33, which is set by the controller 2A. The stop detection section 44 is set as a section which includes the target position 42 and is within the driving section 41.

Figure 11:
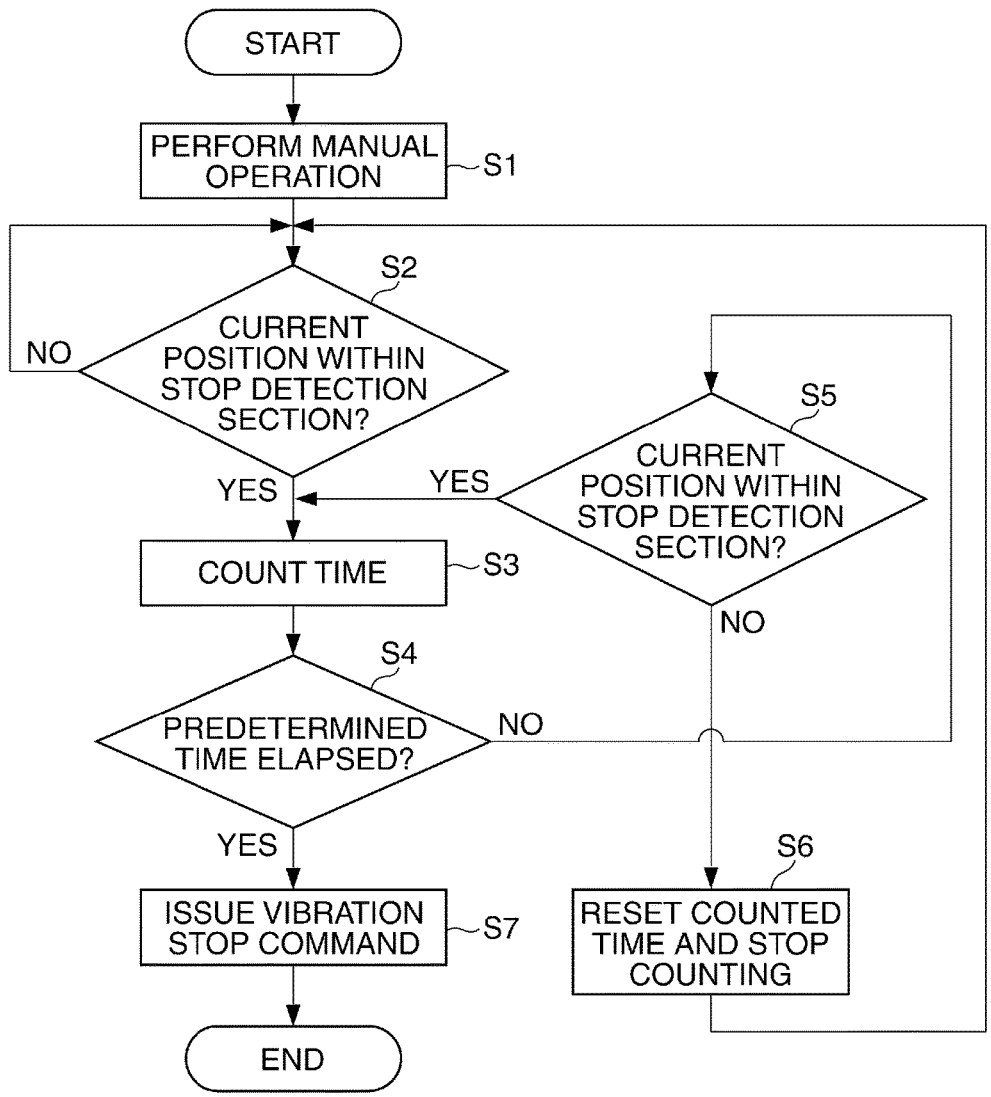
FIG. 11 is a flowchart of a drive control process performed by the controller, for controlling driving of the vibration actuator.

FIG. 11 is a flowchart of a process for controlling driving of the vibration actuator 1, which is performed by the controller 2A and mainly shows a flow of processing associated with the operation of the stop detection section 27. In a step S1, a host controller of the controller 2A (e.g. the MPU 200 that controls the overall operation of the image pickup apparatus 100) controls the controller 2A to drive the vibration actuator 1 so as to make it possible to manually operate the operation member 3, in response to a predetermined user's operation as a trigger. More specifically, as described hereinabove, the vibration ratio command value 33 is set to 0 to thereby generate only thrust-up vibration in the elastic body 13. As a result, the frictional holding force acting between the elastic body 13 and the driven element 15 is reduced, and hence the operation member 3 can be manually rotated.

When the current position 40 enters the driving section 41 by the operator's operation for rotating the operation member, the vibration ratio-determining section 24 outputs the vibration ratio command value 33 based on the distance between the current position 40 and the target position 42. As a result, the drive signals 30 for moving the operation member 3 to the target position 42 are output from the drive signal-generating section 20 to thereby drive the vibration actuator 1.

In the following step S2, the position-in-range determination section 26 determines whether or not the current position 40 is in the stop detection section 44 set in the driving section 41. If the current position 40 is outside the stop detection section 44 (NO to the step S2), the position-in-range determination section 26 repeats the determination processing, and when the current position 40 is in the stop detection section 44 (YES to the step S2), the process proceeds to a step S3.

Then, in the step S3, the stop detection section 27 counts time during which the current position 40 is in the stop detection section 44. Then, in a step S4, the stop detection section 27 determines whether or not a predetermined time period has elapsed in a state in which the current position 40 remains in the stop detection section 44. In other words, the stop detection section 27 determines whether or not the current position 40 remains within the stop detection section 44 for the predetermined time period.

The predetermined time period used as a reference for determination in the step S4 can be set and changed by the operator via the user interface of the image pickup apparatus 100, and is set, for example, to 0.05 seconds. If this predetermined time period is set to be too short, in spite of the operator's intension to rotate the operation member 3 such that the current position 40 passes one or a plurality of driving sections 41, the stop of the operation member 3 is detected, and hence the operator is required to stepwise perform the rotation operation a plurality of times, which degrades the operability. On the other hand, if this predetermined time period is set to be too long, the operator is required to deliberately hold the operation member 3 in the stop detection section 44, which degrades the operability, and further, when the drive signal 30 is actually stopped in a step S7, referred to hereinafter, the current position 40 of the operation member 3 sometimes overshoots the target position 42. Therefore, the predetermined time period used as the reference for determination in the step S4 is desired to be set to an appropriate time period by taking into account the configuration of the image pickup apparatus 100, the sensibilities of the operator, and so forth.

If the predetermined time period has elapsed in the state in which the current position 40 is within the stop detection section 44 (YES to the step S4), the stop detection section 27 proceeds to the step S7. On the other hand, if the time period elapsed after the current position 40 enters the stop detection section 44 does not reach the predetermined time period (NO to the step S4), the stop detection section 27 proceeds to a step S5.

In the step S5, similar to the step S2, the position-in-range determination section 26 determines whether or not the current position 40 is within the stop detection section 44. If the current position 40 is in the stop detection section 44 (YES to the step S5), the process proceeds to the step S3 to continue counting the time, whereas if the current position 40 is outside the stop detection section 44 (NO to the step S5), the process proceeds to a step S6, wherein the stop detection section 27 resets the counted time to stop counting time, and then returns to the step S2. On the other hand, in the step S7, the stop detection section 27 judges that the current position 40 has stopped in the vicinity of the target position 42, and outputs a driving stop command to the drive signal-generating section 20. Upon receipt of the driving stop command from the stop detection section 27, the drive signal-generating section 20 stops outputting of the drive signal 30. As a result, driving of the vibration actuator 1 is stopped, whereby the driven element 15 and the operation member 3 are held at a high holding torque in the static state. Execution of the step S7 terminates the present process.

Note that the drive signal-generating section 20 may stop driving of the vibration actuator 1 using a method other than the method of stopping outputting of the drive signal 30 upon receipt of the driving stop command from the stop detection section 27 in the step S7. For example, the drive signal-generating section 20 may stop driving of the vibration actuator 1 using a method of sweeping the frequency of the drive signal 30 to a sufficiently high frequency, or a method of reducing the voltage amplitude of the drive signal. Further, the driving of the vibration actuator 1 may be stopped by stopping outputting of the drive signal 30 after sweeping the frequency of the drive signal 30 to a sufficiently high frequency. These methods also make it possible to increase the frictional holding force acting between the elastic body 13 and the driven element 15 to thereby hold the operation member 3. Further, to prevent the control calculator 23 from outputting an abnormal value, it is desirable to set the target vibration amplitude 31 output from the vibration amplitude-setting section 22 to 0, when the stop detection section 27 outputs the driving stop command to the drive signal-generating section 20 and the vibration amplitude-setting section 22.

By performing the above-described control, when the operator manually rotates the operation member 3 to cause the current position 40 to reach the vicinity of the target position 42 as a goal, the operation member 3 is drawn into the target position 42. Further, the operation member 3 is automatically held at a high holding torque in the static state in which the driving of the vibration actuator 1 is stopped. This enables the operator to easily know that the positioning of the operation member 3 is completed. Further, the positioning of the operation member 3 is performed by the position control of the vibration actuator 1, and hence it is possible to position the operation member 3 with high accuracy.

Also in the control performed by the controller 2A, similar to the control performed by the controller 2, one of the three values of 0, a positive value, and a negative value may be output as the vibration ratio command value 33, and further, the controller 2A may be configured such that the vibration amplitude-detecting section 4 is not used. Further, the shape of the vibration actuator used to drive the operation member 3 is not limited to the annular shape shown in FIG. 1, but may be a vibration actuator provided with either of the vibration element 110 shown in FIGS. 7A to 7C and the vibration element 120 shown in FIGS. 8A to 8C.

Figure 12:
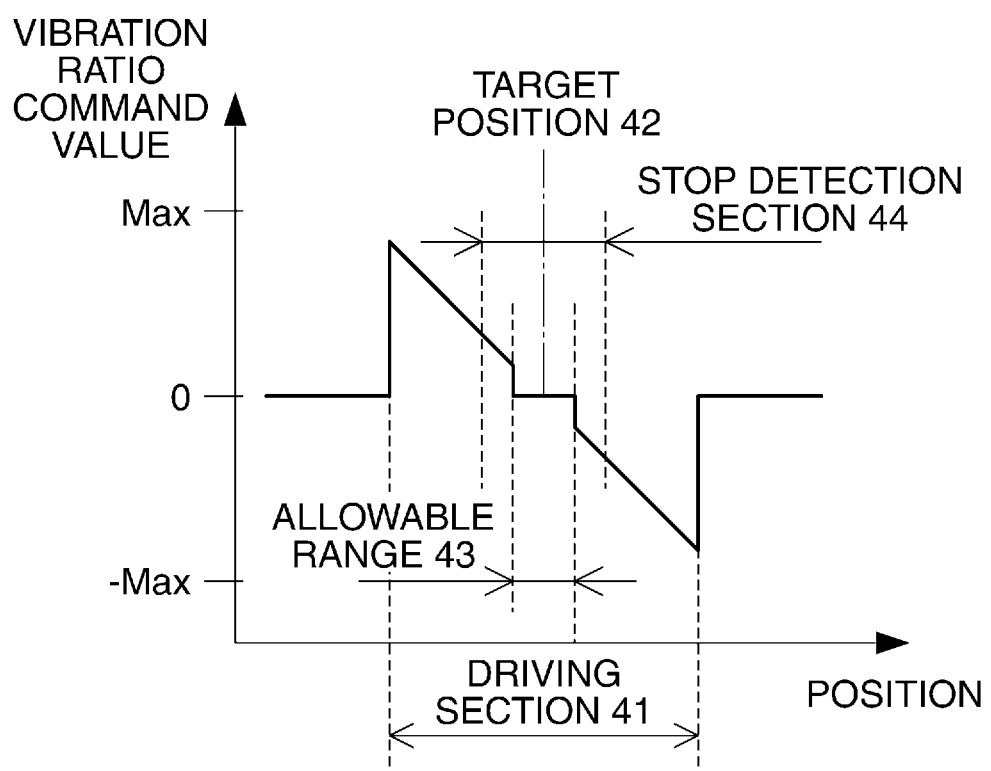
FIG. 12 is a graph showing a variation of the relationship between the driving section, the target position, and the stop detection section, and the vibration ratio command value, shown in FIG. 10.

FIG. 12 is a graph showing a variation of the relationship between the driving section 41, the target position 42, and the stop detection section 44, and the vibration ratio command value 33, shown in FIG. 10. The allowable range 43 in which the vibration ratio command value 33 is set to 0 is provided in the vicinity of the target position 42, and this makes it possible to prevent a vibrational reciprocating motion from being generated in the operation member 3 in the vicinity of the target position 42. In this case, the allowable range 43 is desired to be set within the stop detection section 44, and this makes it possible to control the driving of the operation member 3 such that the current position 40 of the operation member 3 is positively drawn into the stop detection section 44.

The drive control of the vibration actuator 1 performed by the controller 2 or 2A is effective from the viewpoints of positioning accuracy and reduction of the operation time, e.g. in a case where an apparatus requiring positioning, such as a robot, is operated manually by taking safety into consideration, and in doing this, it is required to perform positioning with high accuracy. Particularly, in recent years, robot technology is used in medical equipment which requires positioning with high accuracy in a medical field, and hence it is necessary to secure reliability of automatic movement of a robot. To secure this reliability, for example, if a safety device or a like measure is provided for the robot, the medical equipment is increased in size, and there is a fear that sufficient driving performance cannot be obtained in an apparatus requiring a very small driving force.

In a robot using the above-described vibration actuator 1 or the vibration actuator provided with either the vibration element 110 or the vibration element 120, this problem can be solved by controlling each vibration actuator by the controller 2 or 2A. That is, it is possible to provide an apparatus which cannot be moved unless an operator manually operates the apparatus, and can perform positioning with high accuracy by assisting the positioning operation with small output, whereby it is possible to secure both reliability and performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, the embodiments of the present invention are described only by way of example, and it is possible to combine the embodiments on an as-needed basis. For example, although in the vibration actuator 1, the piezoelectric element 12 is used as the electromechanical energy conversion element, an electrostrictive element, a magnetostrictive element or the like may be used in place of the piezoelectric element 12.

Further, in the embodiments, the description is given of the form in which the manual operation of the operation member 3 is assisted by the driving control of the vibration actuator 1 by the controller 2 or 2A. This is not limitative, but for example, in a robot in which automatic positioning is controlled by a controller, if the operation mode can be shifted to an operation mode in which the manual operation can be performed, by an instruction from the controller or an operator, the above-described embodiments can be applied to the manual operation in this case.

This application claims the benefit of Japanese Patent Application No. 2015-123829 filed Jun. 19, 2015, which is hereby incorporated by reference herein in its entirety.

What is claimed is:

1. A vibration drive device comprising:
a vibration actuator including:
a vibration element including an electromechanical energy conversion element, and an elastic body joined to said electromechanical energy conversion element, and
a driven element that is in pressure contact with said elastic body;
a position detection unit configured to detect a relative position between said vibration element and said driven element; and
a controller that applies a drive signal, for exciting vibration in said elastic body, to said electromechanical energy conversion element to control driving of said elastic body of said vibration actuator,
wherein in a case where the relative position is outside a first section, said controller performs control to excite in said elastic body a first vibration in a direction perpendicular to a contact surface between said elastic body and said driven element, whereas in a case where the relative position is within the first section, said controller performs control to excite said elastic body so as to make the relative position closer to a target position set within the first section and performs control to excite said elastic body strongly toward a position farther away from the target position.

2. The vibration drive device according to claim 1, wherein the first section includes a second section including the target position, and
wherein in a case where the relative position is within the second section, said controller excites the first vibration in said elastic body by applying the drive signal.

3. The vibration drive device according to claim 1, further comprising a target position-setting unit configured to set the target position.

4. The vibration drive device according to claim 1, further comprising a section setting unit configured to set a section, in which said controller excites the first vibration in said elastic body by the drive signal, between each of two adjacent sections of a plurality of the first sections.

5. The vibration drive device according to claim 1, wherein the vibration includes the first vibration and a second vibration parallel to the contact surface in said elastic body, and
said controller changes an amplitude value of the first vibration or an amplitude value of the second vibration.

6. The vibration drive device according to claim 1, further comprising a determination unit configured to determine whether or not the relative position is within the first section.

7. The vibration drive device according to claim 1, wherein the vibration includes the first vibration and a second vibration parallel to the contact surface in said elastic body,
the vibration drive device further comprises an amplitude detection unit configured to detect an amplitude of the first vibration or an amplitude of the second vibration excited in said elastic body, and
said controller controls an amplitude of the drive signal based on the amplitude detected by said amplitude detection unit.

8. The vibration drive device according to claim 1, wherein said controller changes a magnitude of a driving force for moving said vibration element and said driven element relative to each other, by applying the drive signal in which one of a frequency, a voltage, and a phase difference is controlled.

9. The vibration drive device according to claim 1, wherein the first section includes a second section including the target position, and wherein said controller stops applying the drive signal to said electromechanical energy conversion element when the relative position is within the second section for a predetermined time period including zero time.

10. The vibration drive device according to claim 9, wherein the second section includes a third section including the target position, and wherein in a case where the relative position is within the third section, said controller excites the first vibration in said elastic body by the drive signal.

11. The vibration drive device according to claim 9, further comprising a determination unit configured to determine whether or not the relative position is within the second section, and wherein when said determination unit determines that the relative position is within the second section, said controller stops applying the drive signal to said electromechanical energy conversion element.

12. The vibration drive device according to claim 1, wherein in a case where the relative position is within the first section, said controller controls the vibration actuator such that a direction of frictional driving forces generated by the vibration actuator depends on which side of the target position the relative position is located.

13. An image pickup apparatus comprising:
a vibration drive device including a vibration actuator, said vibration actuator including:
  a vibration element including an electromechanical energy conversion element, and an elastic body joined to said electromechanical energy conversion element, and
  a driven element that is in pressure contact with said elastic body; and
an operation member that is directly or indirectly joined to said vibration actuator included in said vibration drive device, and is driven by said vibration actuator, said vibration drive device further including:
  a position detection unit configured to detect a relative position between said vibration element and said driven element, and
  a controller that applies a drive signal, for exciting vibration in said elastic body, to said electromechanical energy conversion element to control driving of said elastic body of said vibration actuator,
wherein in a case where the relative position is outside a first section, said controller performs control to excite in said elastic body a first vibration in a direction perpendicular to a contact surface between said elastic body and said driven element, whereas in a case where the relative position is within the first section, said controller performs control to excite said elastic body so as to make the relative position closer to a target position set within the first section and performs control to excite said elastic body strongly toward a position farther away from the target position.

14. The image pickup apparatus according to claim 13, further comprising a switch that generates a signal for allowing manual operation of said operation member by reducing a frictional holding force acting between said elastic body and said driven element forming said vibration actuator, and wherein when said switch is turned on, said controller applies the drive signal for exciting the first vibration in said elastic body to said electromechanical energy conversion element.

15. The image pickup apparatus according to claim 13, wherein said operation member has an annular shape, and is arranged in a manner surrounding a photographic optical system included in the image pickup apparatus, about an optical axis, and wherein a photographing mode or a photographing parameter is set by a manual operation for rotating said operation member about the optical axis.

16. A vibration drive device comprising:
a vibration actuator including:
  a vibration element including an electromechanical energy conversion element, and an elastic body joined to said electromechanical energy conversion element, and
  a driven element being in contact with said elastic body;
a position detection unit configured to detect a relative position between said vibration element and said driven element; and
a controller that applies a drive signal, for exciting vibration in said elastic body, to said electromechanical energy conversion element to control driving of said elastic body of said vibration actuator,
wherein in a case where the relative position is within a first section, said controller performs control to excite said elastic body so as to make the relative position closer to a target position set within the first section, whereas in a case where the relative position is outside the first section, said controller performs control to excite in said elastic body a first vibration in a direction perpendicular to a contact surface between said elastic body and said driven element.

17. The vibration drive device according to claim 16, wherein the vibration includes the first vibration and a second vibration, wherein said controller performs control to increase the second vibration as the relative position is moved farther away from the target position, and wherein the second vibration is a vibration in a direction parallel to the contact surface.

18. The vibration drive device according to claim 16, wherein the vibration includes the first vibration and a second vibration, wherein said controller performs control to increase the ratio of the second vibration to the first vibration as the relative position is moved farther away from the target position, and wherein the second vibration is a vibration in a direction parallel to the contact surface.

19. An image pickup apparatus comprising:
a vibration drive device including a vibration actuator, said vibration actuator including:
  a vibration element including an electromechanical energy conversion element, and an elastic body joined to said electromechanical energy conversion element, and
  a driven element being in contact with said elastic body;
an operation member that is directly or indirectly joined to said vibration actuator included in said vibration drive device, and is driven by said vibration actuator, said vibration drive device further including:
- a position detection unit configured to detect a relative position between said vibration element and said driven element, and
- a controller that applies a drive signal, for exciting vibration in said elastic body, to said electromechanical energy conversion element to control driving of said elastic body of said vibration actuator, wherein in a case where the relative position is within a first section, said controller performs control to excite said elastic body so as to make the relative position closer to a target position set within the first section, whereas in a case where the relative position is outside the first section, said controller performs control to excite in said elastic body a first vibration in a direction perpendicular to a contact surface between said elastic body and said driven element.

20. The image pickup apparatus according to claim 19, wherein the vibration includes the first vibration and a second vibration,
- wherein said controller performs control to increase the second vibration as the relative position is moved farther away from the target position, and
- wherein the second vibration is a vibration in a direction parallel to the contact surface.

21. The image pickup apparatus according to claim 19, wherein the vibration includes the first vibration and a second vibration,
- wherein said controller performs control to increase the ratio of the second vibration to the first vibration as the relative position is moved farther away from the target position, and
- wherein the second vibration is a vibration in a direction parallel to the contact surface.

* * * * *